US010677713B1

(12) United States Patent
Yap et al.

(10) Patent No.: US 10,677,713 B1
(45) Date of Patent: Jun. 9, 2020

(54) ADAPTIVE GAS ANALYZER

(71) Applicant: HRL Laboratories, LLC, Malibu, CA (US)

(72) Inventors: Daniel Yap, Los Angeles, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/669,519

(22) Filed: Aug. 4, 2017

Related U.S. Application Data

(60) Provisional application No. 62/371,106, filed on Aug. 4, 2016, provisional application No. 62/460,022, filed on Feb. 16, 2017.

(51) Int. Cl.
*G01N 21/01* (2006.01)
*G01N 21/39* (2006.01)
(Continued)

(52) U.S. Cl.
CPC .............. *G01N 21/01* (2013.01); *C40B 20/08* (2013.01); *G01N 21/39* (2013.01); *G01N 30/02* (2013.01);
(Continued)

(58) Field of Classification Search
CPC ........ G01N 21/65; G01N 21/39; G01N 21/35; G01N 21/94; G01N 2201/0612;
(Continued)

(56) References Cited

U.S. PATENT DOCUMENTS 4,467,038 A * 8/1984 Scott ...................... G01N 30/84
422/80
4,962,042 A * 10/1990 Morabito ............... G01N 30/14
422/89
(Continued)

OTHER PUBLICATIONS

"Detection of Nitroaromatic and Peroxide Explosives in Air Using Infrared Spectroscopy: QCL and FTIR," L. C. Pacheco-Londono, J. R. Castro-Suarez and S. P. Hernandez-Rivera, Advances in Optical Technologies, vol. 2013, Article ID 532670, Mar. 11, 2013.
(Continued)

*Primary Examiner* — Sang H Nguyen
(74) *Attorney, Agent, or Firm* — Ladas & Parry

(57) ABSTRACT

A gas-phase chemical analyzer has at least one gas chromatography column in gas-flow communication with at least one gas carrying tube of an optical absorption cell, a laser for illuminating molecules in a gas mixture flowing though the at least one gas carrying tube of the optical absorption cell, and a photodetector or photodetecting apparatus for measuring absorption spectra of the gas mixture illuminated by the laser. A first module is provided for statically identifying particular molecules in the gas mixture from other molecules in said gas mixture and a second module is provided for comparing at least selected ones of the particular molecules in the gas mixture with a reference library of absorption spectra of previously identified molecules and for determining the likelihood of a correct identification of the particular molecules in the gas mixture and the previously identified molecules in the reference library.

21 Claims, 23 Drawing Sheets

(51) Int. Cl.
*G01N 30/02* (2006.01)
*G01N 30/74* (2006.01)
*G01N 30/86* (2006.01)
*G01N 30/28* (2006.01)
*C40B 20/08* (2006.01)

(52) U.S. Cl.
CPC ............ *G01N 30/28* (2013.01); *G01N 30/74* (2013.01); *G01N 30/8603* (2013.01); *G01N 2021/0106* (2013.01); *G01N 2030/025* (2013.01); *G01N 2030/862* (2013.01)

(58) Field of Classification Search
CPC ....... G01N 2201/067; G01N 2021/399; G01N 21/01; G01N 2021/0106; G01N 2030/025; G01N 2030/862; G01N 30/02; G01N 30/74; G01N 30/28; G06F 17/5009; G06F 17/10; G01J 3/0208; G01F 3/42; C40B 20/08
See application file for complete search history.

(56) References Cited

U.S. PATENT DOCUMENTS

| | | | |
|---|---|---|---|
| 6,248,078 B1* | 6/2001 | Risby | A61B 5/097 600/529 |
| 7,101,340 B1* | 9/2006 | Braun | A61B 5/097 128/920 |
| 7,368,000 B2* | 5/2008 | Jain | B01D 53/025 95/127 |
| 7,508,521 B2* | 3/2009 | Liu | G01J 3/433 356/432 |
| 7,704,301 B2* | 4/2010 | Zhou | G01N 21/3504 423/210 |
| 8,999,245 B2* | 4/2015 | Wang | G01N 30/30 422/70 |
| 9,903,757 B1* | 2/2018 | Yap | G01J 3/108 |
| 2005/0023127 A1* | 2/2005 | Woste | B01D 53/007 204/157.3 |
| 2006/0130649 A1* | 6/2006 | Jain | B01D 53/025 95/82 |
| 2007/0273882 A1* | 11/2007 | Smith | G01N 21/39 356/437 |
| 2008/0288182 A1* | 11/2008 | Cline | G01J 3/02 702/24 |
| 2009/0001262 A1* | 1/2009 | Visser | G06K 9/6242 250/282 |
| 2010/0140461 A1* | 6/2010 | Sprigle | G01J 3/2823 250/226 |
| 2010/0154511 A1* | 6/2010 | Lambertus | G01N 30/463 73/25.03 |
| 2012/0133775 A1* | 5/2012 | Treado | G01J 3/32 348/164 |
| 2013/0129182 A1* | 5/2013 | Noyel | G06T 7/0004 382/141 |
| 2013/0250301 A1* | 9/2013 | Feitisch | G01N 21/3504 356/409 |
| 2015/0032019 A1* | 1/2015 | Acker | A61B 5/082 600/532 |
| 2016/0132617 A1* | 5/2016 | Liu | G06F 17/5009 703/2 |

OTHER PUBLICATIONS

"Real-time Trace Gas Sensing of Fluorocarbons using a Swept-wavelength External Cavity Quantum Cascade Laser," M. C. Phillips, et al., Analyst, vol. 139, pp. 2047-2056, 2014.

"Quad Quantum Cascade Laser Spectrometer with Dual Gas Cells for the Simultaneous Analysis of Mainstream and Sidestream Cigarette Smoke," R. E. Baren, et al., Spectrochimica Acta Part A, vol. 60, pp. 3437-3447, 2004.

"Microfabricated Gas Chromatograph for Rapid, Trace-level Determinations of Gas-phase Explosive Marker Compounds," W. R. Collin, et al., Analytical Chemistry, vol. 86, pp. 655-663, 2013.

"Limits of Recognition for Binary and Ternary Vapor Mixtures Determined with Multitransducer Arrays," C. Jin and E. T. Zellers, Analytical chemistry, vol. 80, No. 19 , pp. 7283-7293, May 9, 2008.

"Gas Chromatography with Spectroscopic Detectors," N. Ragunathan, et al., J. Chromatography A, vol. 856, pp. 349-397, 1999.

"Rapid Screening and Identification of Illicit Drugs by IR Absorption Spectroscopy and Gas Chromatography," S. Mengali, et al., Proceedings of SPIE, vol. 8631, pp. 86312F1-10, 2013.

"Hollow Waveguide Quantum Cascade Laser Spectrometer as an Online Microliter Sensor for Gas Chromatography," S. Wu, et al., Journal of Chromatography A, vol. 1188, pp. 327-330, 2008.

"A Semi-blind Source Separation Method for Differential Optical Absorption Spectroscopy of Atmospheric Gas Mixtures," Y. Sun, et al., Inverse Problems and Imaging, vol. 8, No. 2, pp. 587-610, 2014.

"Smart Multi-channel Two-dimensional Micro-gas Chromatography for Rapid Workspace Hazardous Volatile Organic Compounds Measurement," J. Liu, et al., Lab Chip, vol. 13, pp. 818-825, Dec. 13, 2012.

"Adaptive Two-dimensional Microgas Chromatography," J. Liu, et al., Analytical Chemistry, vol. 84, pp. 4214-4220, Apr. 2, 2012.

"Efficient Single-photon Counting at 1.55 µm by Means of Frequency Upconversion," M. A. Albota and F. N. C. Wong, Optics Letters, vol. 29, pp. 1449-1451, Jul. 1, 2004.

U.S. Appl. No. 15/280,575, filed Sep. 29, 2016, Owechko.

Bruckstein et al., "From Sparse Solutions of Systems of Equations to Sparse Modeling of Signals and Images" SIAM Review, vol. 51, No. 1, pp. 34-81, 2009.

Cardoso, J., "High-order contrasts for independent component analysis," Neural Computation, vol. 11, No. 1, pp. 157-192, 1999.

Lloyd, S., "Least squares quantization using PCM," IEEE Transactions on Information Theory, vol. 28, No. 2, pp. 129-137, Mar. 1982.

Wagner, et al., "Towards a Practical Face Recognition System: Robust Alignment and Illumination by Sparse Representation," IEEE Transactions on Pattern Analysis and Machine Intelligence (TPAMI), vol. 34, No. 2, pp. 372-386, Feb. 2012.

Wright, A. et al., "Robust Face Recognition via Sparse Representation," IEEE Transactions on Pattern Analysis and Machine Intelligence (TPAMI), vol. 31. No. 2, Feb. 2009.

U.S. Appl. No. 16/054,233, filed Aug. 3, 2018, Yap.

From U.S. Appl. No. 16/054,233, (filed Aug. 3, 2018, unpublished, non-publication requested), Application and Office Actions.

Barkai, A. et al., "Double-stage taper for coupling between SOI waveguides and single-mode fiber," Journal of Lightwave Technology, vol. 26, No. 24, pp. 3860-3865 (2008).

Clement, Q. et al., "Pulsed, tunable, single-frequency OP-GaAs OPO for the standoff detection of hazardous chemicals in the longwave infrared," Proceeding of SPIE vol. 9649 (2015), pp. 964904-1 to 964904-10 (11 pages).

DeCamp, M.F. et al., "Upconversion multichannel infrared spectrometer," Optics Letters, vol. 30, No. 14 (2005), pp. 1818-1820.

Devi, K. et al., "Continuous-wave, multi-milliwatt, mid-infrared source tunable across 6.4-7.5 µm based on orientation-patterned GaAs," Optics Letters, vol. 39, No. 23 (2014), pp. 6751 to 6754.

Ma, L. et al., "Up-conversion single-photon detector using multi-wavelength sampling techniques," Optics Express, vol. 19, No. 6 (2011) pp. 5470 to 5479.

Pelc, J.S. et al., "Influence of domain disorder on parametric noise in quasi-phase-matched quantum frequency converters," Optics Letters, vol. 35, No. 16 (2010), pp. 2804-2806.

Rutledge, D. N., "Independent Components Analysis with the JADE algorithm", TrAC Trends in Analytical Chemistry, vol. 50, pp. 22-32, 2013.

* cited by examiner

Input pulse of gas mixture injected from sampler/concentrator

Gas-molecule flow module:
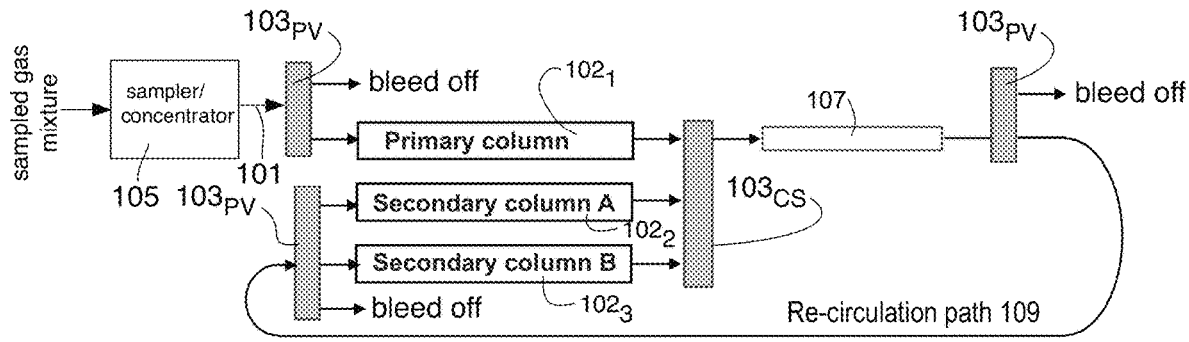
Photon flow module:
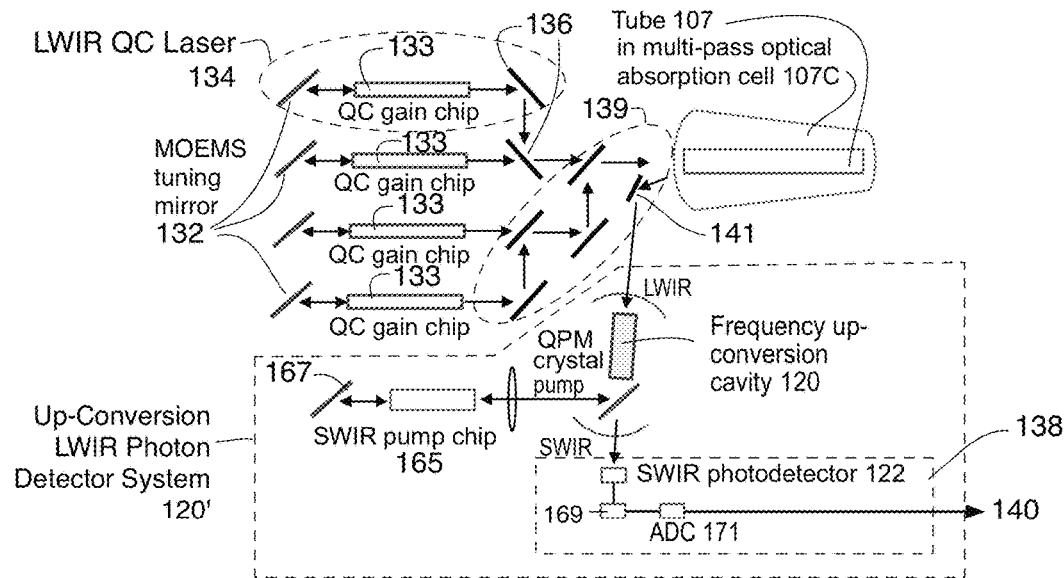
Fig. 7(a)

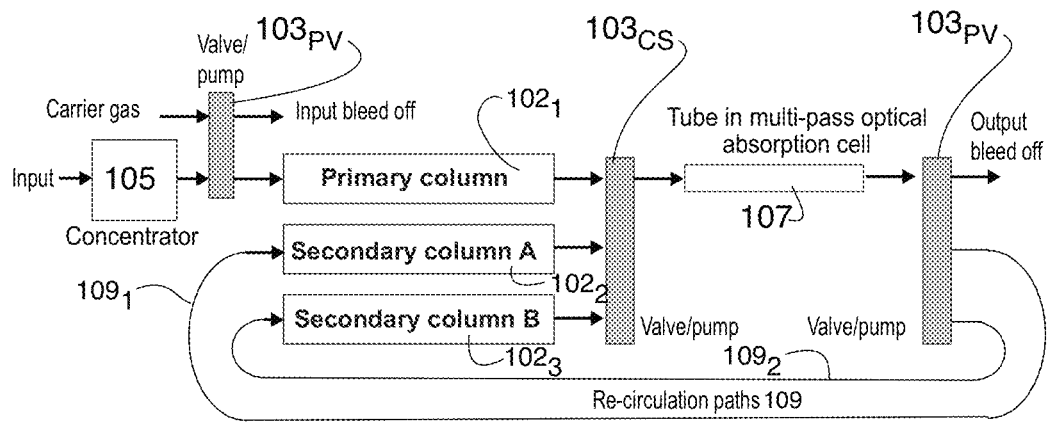
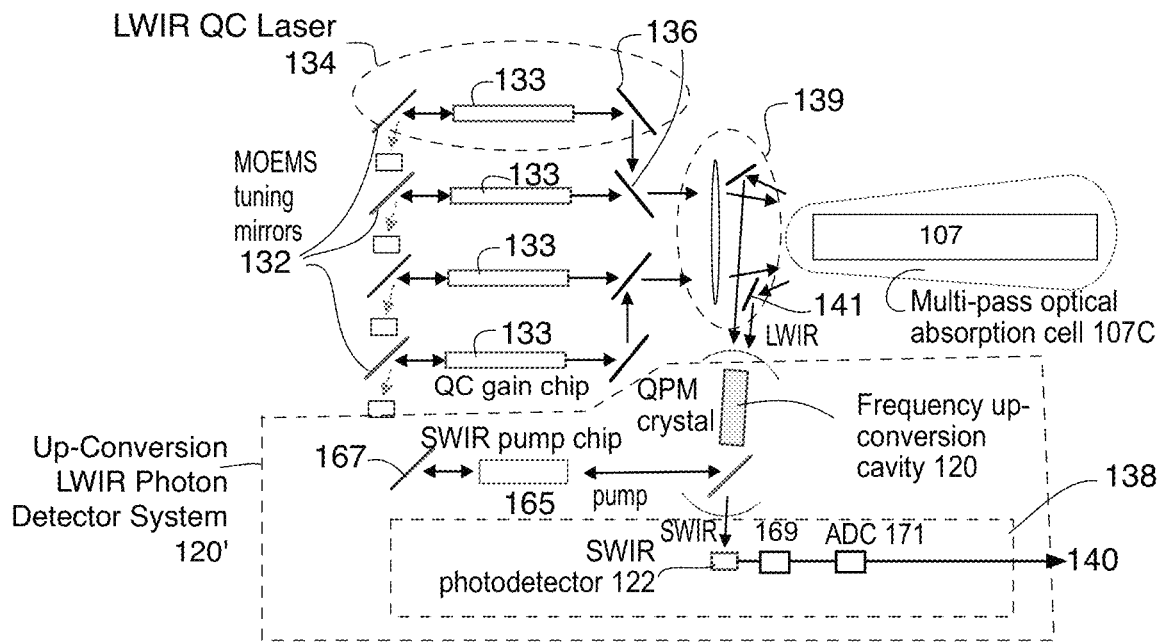
Fig. 7(b)

Gas-molecule flow module:
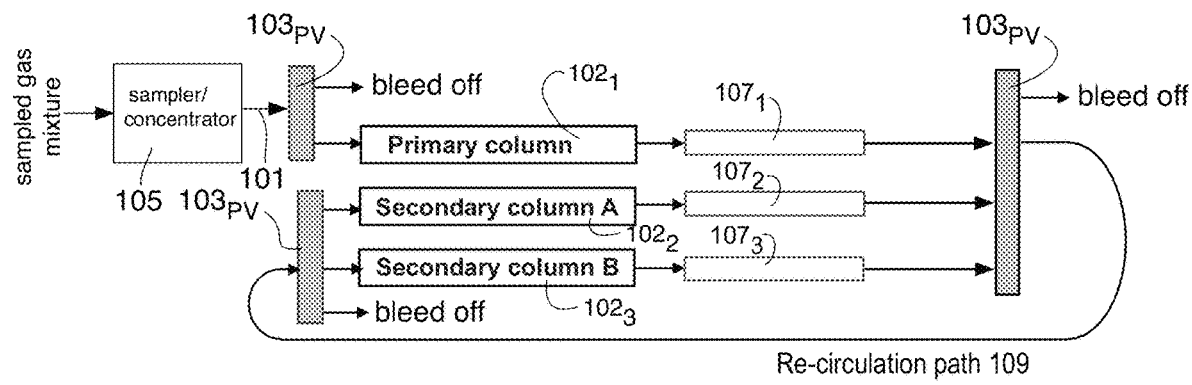
Photon flow module:
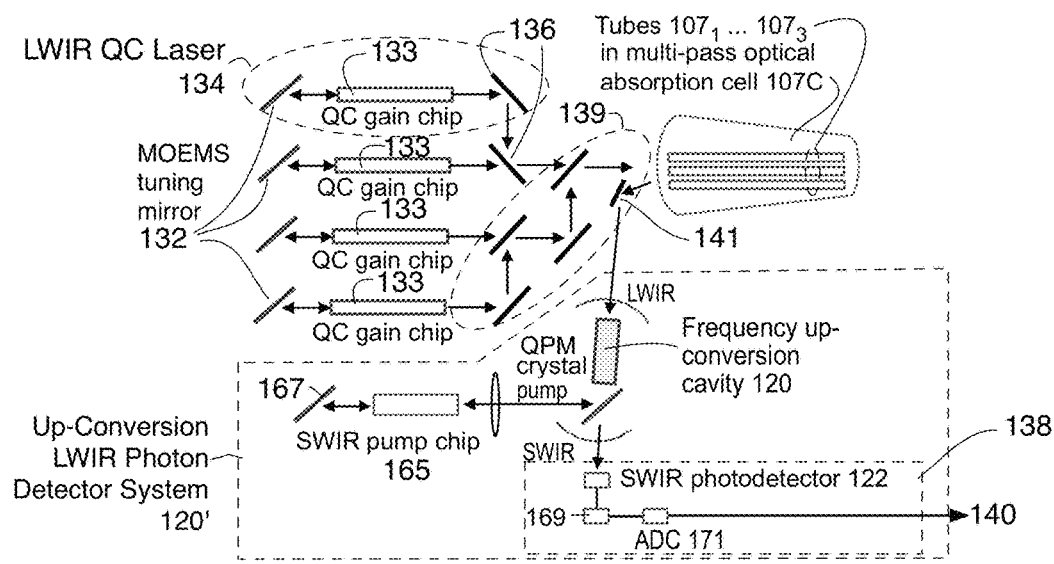
Fig. 7(c)

De-mixed component spectra generated by ICA algorithm
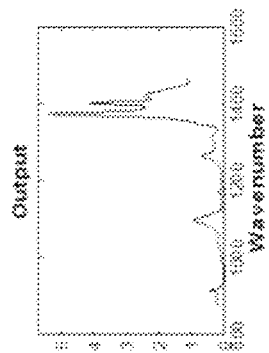
Fig. 10(b)(1)
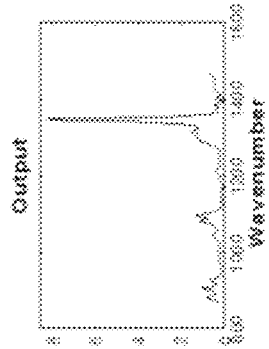
Fig. 10(b)(2)
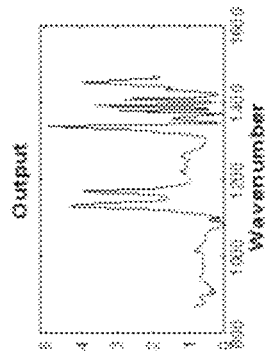
Fig. 10(b)(3)
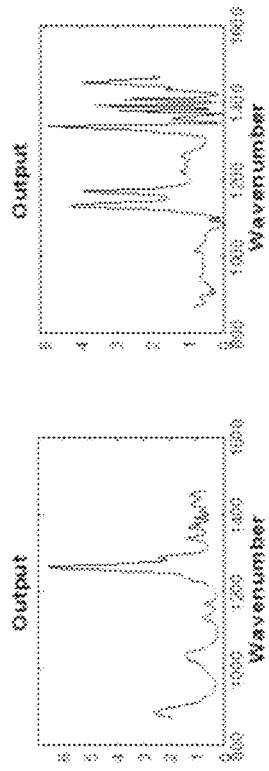
Fig. 10(b)(4)

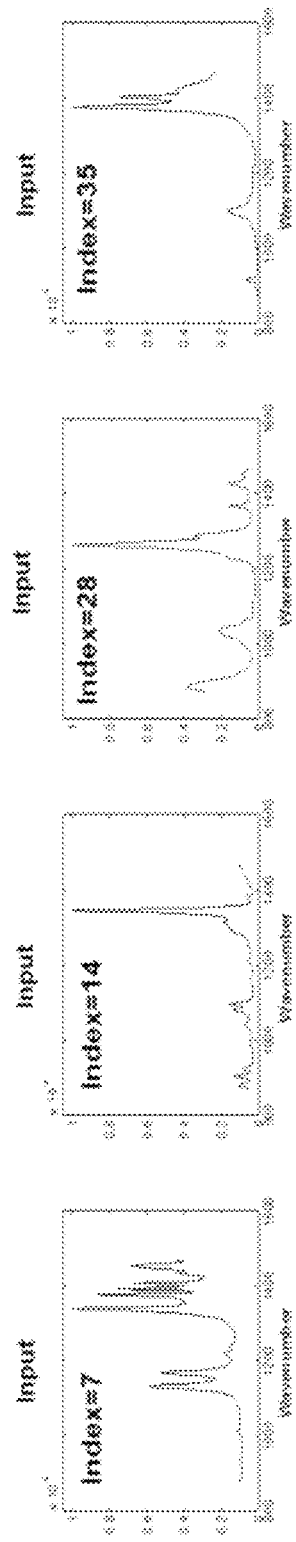

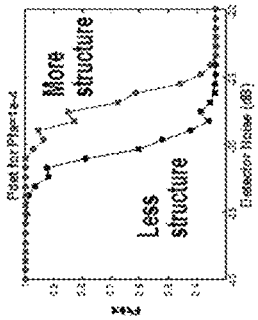
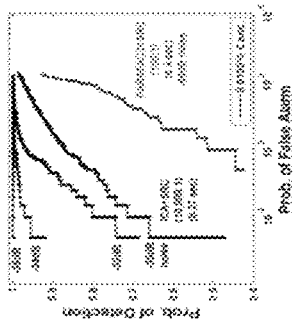
Fig. 11(c)
Fig. 11(d)
Characteristics of spectra of analyte components in the mixture
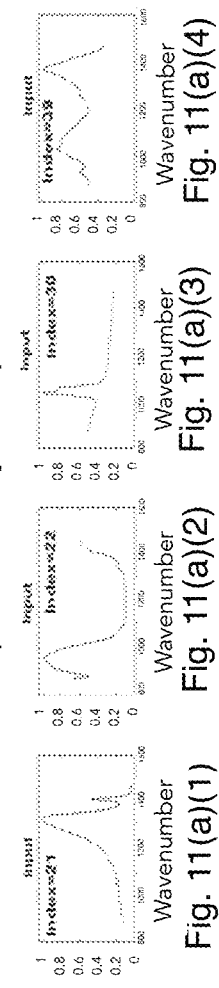
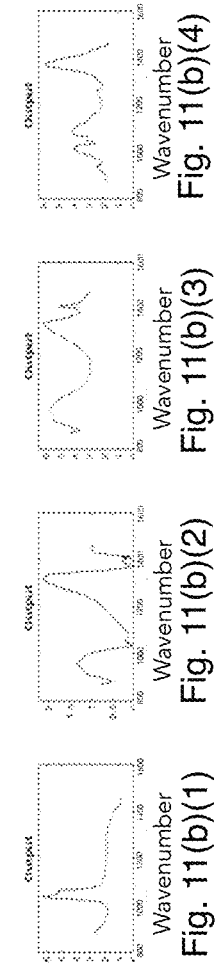
Fig. 11(a)(1) Wavenumber
Fig. 11(a)(2) Wavenumber
Fig. 11(a)(3) Wavenumber
Fig. 11(a)(4) Wavenumber
Fig. 11(b)(1) Wavenumber
Fig. 11(b)(2) Wavenumber
Fig. 11(b)(3) Wavenumber
Fig. 11(b)(4) Wavenumber
De-mixed component spectra generated by ICA algorithm

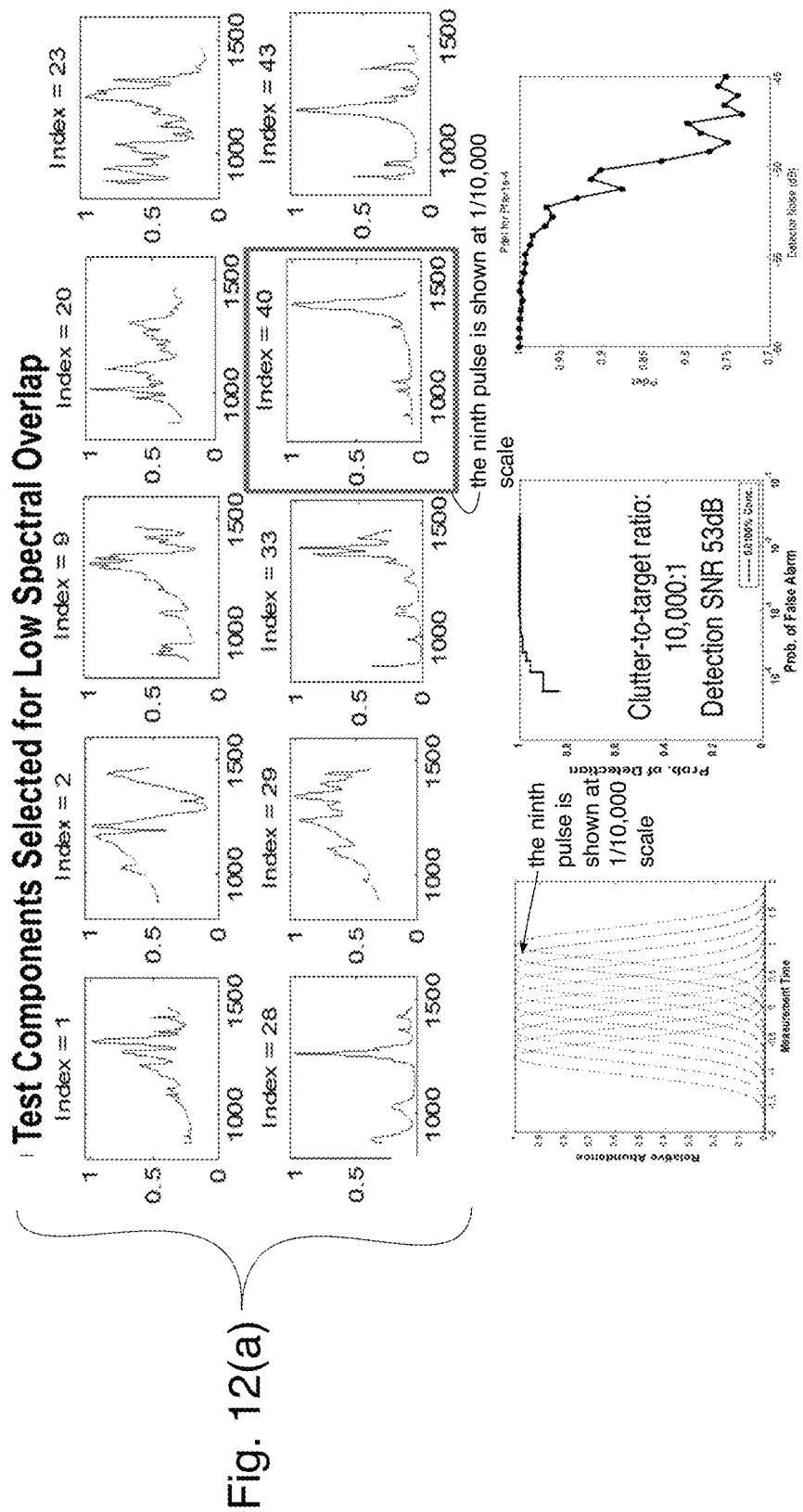

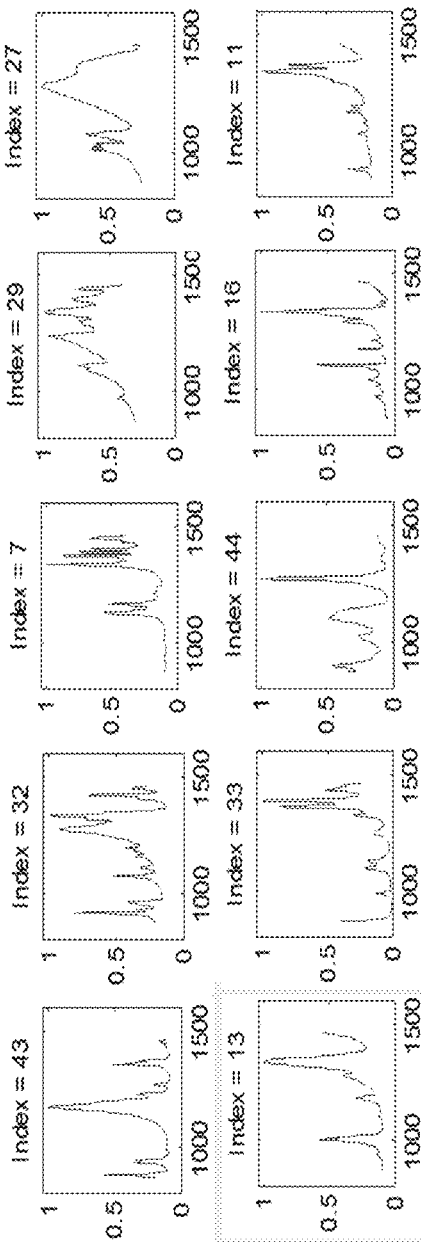
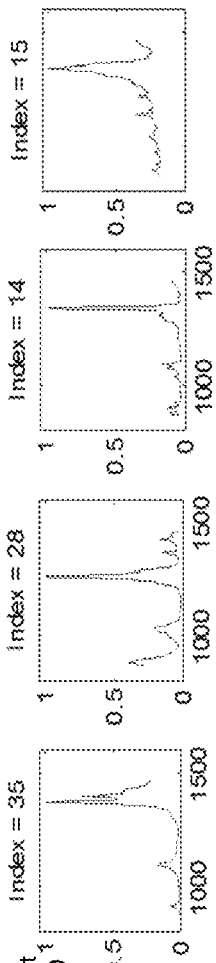
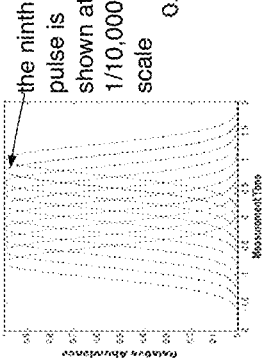
Fig. 13(a)
Fig. 13(b)
Fig. 13(c)

ADAPTIVE GAS ANALYZER

CROSS REFERENCE TO RELATED APPLICATIONS

This application claims the benefit of U.S. Provisional Patent Application Ser. No. 62/371,106, entitled "Adaptive Gas Analyzer", filed on 4 Aug. 2016, the disclosure of which is hereby incorporated herein by this reference. This application also claims the benefit of U.S. Provisional Patent Application Ser. No. 62/460,022, entitled "Adaptive Gas Analyzer", filed on 16 Feb. 2017, the disclosure of which is also hereby incorporated herein by reference.

This application is related to (i) U.S. Provisional Patent Application Ser. No. 62/234,653, filed in the United States on Sep. 29, 2015, entitled, "Fusion of Independent Component Analysis and Sparse Representation and Classification for Analysis of Spectral Data," the disclosure of which is hereby incorporated herein by reference, and to (ii) a related application which claims the benefit of 62/234,653, namely U.S. patent application Ser. No. 15/280,575 filed Sep. 29, 2016 and entitled "Fusion of Independent Component Analysis and Sparse Representation Based Classification for Analysis of Spectral Data".

STATEMENT REGARDING FEDERALLY SPONSORED RESEARCH OR DEVELOPMENT

None.

TECHNICAL FIELD

This invention relates to gas analyzers.

BACKGROUND

Prior art analyzers have combined multiple gas chromatography (GC) columns comprising non-polar and polar stationary-phase materials and also a mass spectrometer (MS). However, the mass spectrometer destroys (by fragmenting) the molecules that it analyzes. Thus, the output of the MS cannot be coupled back into another GC column for additional separation. The MS can distinguish between the components in some mixtures, but depends on the GC columns to do most of the separation of the components in complex mixtures. Other prior analyzers have combined a GC column and an infrared absorption spectrometer (IAS), with the output of the GC column coupled to a gas-carrying tube in the IAS. Mid-infrared light is coupled to this tube and certain wavenumbers of that light is absorbed by the molecules conducted through the tube. The pattern of absorbed and non-absorbed wavenumbers of light is detected by a photo-detector in the IAS. This pattern of absorbed and non-absorbed wavenumbers represents an absorption spectrum of the gas in the tube. In some of these prior GC-IAS analyzers, the output of the IAS tube could be coupled to another chemical detector, such as a thermal-conductivity detector, that senses the presence of a compound in the gas flow, since that compound to be detected generally is a larger molecule than the molecules of the carrier gas for the flow, which typically would be helium or nitrogen. For all of these prior analyzers, either GC-MS or GC-IAS, the gas mixture first goes through the set of GC columns and is supplied to the spectrometer but is not coupled again to additional GC columns.

Examples of prior art gas analyzers based on infrared-laser absorption spectroscopy include the LaserSenseML™ system by Block Engineering, the Nitrolux™ ammonia sensor by Pranalytica and the Mini Monitor by Aerodyne Research, Inc. The LaserSense™ system measures various hydrocarbon gases (C1 through C5). The systems from Aerodyne Research can detect and monitor trace gases such as methane, nitrous oxide, nitric oxide, carbon monoxide, carbon dioxide, formaldehyde, formic acid, ethylene, acetylene, carbonyl sulfide, acrolein, ammonia and others. These gas analyzers contain a quantum-cascade (QC) laser source of tunable wavelength (or wavenumber), one or more gas-containing cells, and a photodetector. Light of only one wavenumber is transmitted at a given time from the QC laser and the single-wavelength light is directed onto the gas molecules, which may be in a multi-pass optical cell, to increase the interaction distance of the light with the molecules being characterized. Light exiting the gas cell is then collected and detected by a photodetector in the system.

Published articles describe the use of tunable quantum cascade laser spectroscopy to detect nitro-aromatic and peroxide explosives in air (see L. C. Pacheco-Londono et al., "Detection of nitroaromatic and peroxide explosives in air using infrared spectroscopy: QCL and FTIR," *Advances in Optical Technologies*, v. 2013, article 532670 (2013)) and to detect fluorocarbons (see M. C. Phillips, et al., "Real-time trace gas sensing of fluorocarbons using a swept-wavelength external cavity quantum cascade laser," *Analyst*, v. 139, p. 2047 (2014)). These articles report demonstrations of sensing of chemicals at low part-per-billion (ppb) concentration levels. Although excellent sensitivities have been achieved by the QC laser based gas analyzers, they have not been able to handle complex mixtures of gases. The most complex mixtures analyzed have contained four or five target species (see M. C. Phillips, et al supra and R. E. Baren, et al., "Quad quantum cascade laser spectrometer with dual gas cells for the simultaneous analysis of mainstream and sidestream cigarette smoke," *Spectrochimica Acta*, Part A, v. 60, p. 3437 (2004)). Algorithms such as partial least squares discriminant analysis and principle component analysis were used to analyze the measured infrared absorption spectra (see L. C. Pacheco-Londono et al. and M. C. Phillips, et al. supra).

Some gas chromatography systems provide separation of mixtures and typically use a detection method such as a flame ionization detector, a photo-ionization detector, or a thermal conductivity detector to sense the presence of analyte molecules that are carried in a flow of the carrier gas, which typically is helium or nitrogen. In general, these detectors do not provide discrimination between chemicals and thus the GC column provides all the necessary separation of mixtures into the individual chemical species or components. Some prior GC systems use as its detector arrays of multiple transducers coated with various chemically selective absorptive films. An example of such prior micro-scale GC systems was able to distinguish mixtures of more than 20 species by using an array of detectors such as chemi-resistors that have chemically selective coatings (see W. R. Collin, et al., "Microfabricated gas chromatograph for rapid, trace-level determinations of gas-phase explosive marker compounds," *Analytical Chemistry*, v. 86, p. 655 (2013)). However, these transducer arrays are not able to handle mixtures containing more than two or three species that are output simultaneously from a GC column, and thus are not physically separated. Even for these relatively simple mixtures, the error in recognition of a component species in the mixture was 5% and higher and maximum concentration ratio that could be handled was only 20:1 (see C. Jin and E. T. Zellers, "Limits of recognition for binary and ternary vapor mixtures determined with multitransducer arrays," *Analytical Chemistry*, v. 80, p. 7283 (May 2008)).

Systems that combine gas chromatography and mass spectrometry can have better specificity, can handle mixtures with more components and also can handle a larger dynamic range, or abundance sensitivity, of relative concentration levels (see N. Ragunathan, et al., "Gas chromatography with spectroscopic detectors," *J. Chromatography A*, v. 856, p. 3 49 (1999)). However, the mass spectrometers require high-vacuum pumps and generally are bulky and consume much electrical power. Also, these systems may require use of He or $H_2$ carrier gas.

Some prior analyzers have the output of a GC column coupled to an optical spectrometer that measured the absorption spectrum of the molecules in that output gas flow (see N. Ragunathan, et al., supra; S. Mengali, et al., "Rapid screening and identification of illicit drugs by IR absorption spectroscopy and gas chromatography," *Proceedings of SPIE* Vol. 8631, p. 86312F (2013); and S. Wu, et al., "Hollow waveguide quantum cascade laser spectrometer as an online microliter sensor for gas chromatography," *Journal of Chromatography A*, v. 1188, p. 327 (2008)).

More recent versions of these GC-IAS systems comprise a wavelength scanned quantum-cascade laser whose emitted light is coupled into a long hollow tube in which the gas to be characterized flows (see N. Ragunathan, et al. and S. Mengali, et al., supra). The combination of the relatively high laser power at each wavelength and the long interaction distance provide by the hollow-waveguide tube enables these GC-IAS systems to approach the sensitivity of the GC-MS systems. These GC-IAS systems have been used only to detect or screen for specific analyte compounds and have not been used for analyzing the constituents in complex mixtures.

Thus, there is a need for gas analyzers that are compact and have low power consumption as well as can handle complex mixtures of many gas species with a large dynamic range of concentration levels.

The absorption spectra measured by prior art GC-IAS systems have not been used to provide additional de-mixing or separation of the components in a gas mixture. The combination of infrared spectrometry and the Independent Component Analysis (ICA) and Sparse Reconstruction and Classification (SRC) algorithms for de-mixing and chemical identification by spectral analysis is described in U.S. Provisional Patent Application Ser. No. 62/234,653, filed in the United States on Sep. 29, 2015, entitled, "Fusion of Independent Component Analysis and Sparse Representation and Classification for Analysis of Spectral Data," and in a related application which claims the benefit of 62/234,653, namely U.S. patent application Ser. No. 15/280,575 filed Sep. 29, 2016 and entitled "Fusion of Independent Component Analysis and Sparse Representation Based Classification for Analysis of Spectral Data". That ICA makes use of multiple spectra measured at differing relative concentrations of the component species in a mixture is ideally suited for the analysis of incompletely separated mixtures that are output or eluted from a gas chromatography column. There is a prior art example in which ICA has been applied to optical spectra (see Y. Sun, et al., "A semi-blind source separation method for differential optical absorption spectroscopy of atmospheric gas mixtures," *Inverse Problems and Imaging*, v. 8, p. 87 (2014)). In that case, ICA was used after a least-squared fitting algorithm was performed first to identify the known components in a mixture. ICA was applied then to the remainder matrix generated by the fitting algorithm to extract the remnant gas components. ICA was not used, in this prior art, to generate de-mixed spectra from the measured spectra of a gas mixture so that the identification algorithm could be more effective, as is done in the presently disclosed analyzer.

Independent Component Analysis (ICA) is a known algorithm for separating a set of mixtures of signals into the constituent components by optimizing a measure of the statistical independence of the outputs. It relies on the components being statistically independent, but does not use prior knowledge of the signals (i.e., it operates blindly). Sparse Representation-based Classification (SRC) models a multi-dimensional signal as a sparse mixture of known library elements by maximizing the sparsity of representation while maintaining the fidelity of the mixture model. These library elements depend on the nature of the signals. For infrared (IR) spectroscopy, they are examples of the chemical spectra of individual substances. SRC also models possible deformations of the signal that can occur during the measurement process. Since ICA and SRC utilize almost orthogonal types of information, using ICA as a front-end for SRC results in a very low net false alarm rate that is close to the product of the individual false alarm rates for ICA and SRC. The ICA-SRC combination also separates spectra from different materials, such as, for example, explosives and commonly occurring surface materials such as plastics, and noise before final classification is performed, which greatly increases clutter rejection and increases sensitivity (e.g., the minimum detectable concentration of a substance), because of the increased signal to noise ratio.

ICA and SRC were developed for different applications. ICA is used primarily for analysis of one-dimensional (1-D) signals, such as audio mixtures or spectra, and also for some image processing applications. SRC, however, was developed by workers in computer vision for recognizing structured two-dimensional (2D) images, such as faces, in a robust way that can compensate for variabilities due to changes in illumination or pose There is prior art relating to gas chromatography systems comprising multiple stages of GC columns that have an on-column detector place at the end of the first GC column (see J. Liu, et al., "Smart multi-channel two-dimensional micro-gas chromatography for rapid workspace hazardous volatile organic compounds measurement," *Lab Chip*, v. 13, p. 818 (2013) and J. Liu, et al., "Adaptive two-dimensional microgas chromatography," *Analytical Chemistry*, v. 184, p. 4214 (2012)). The on-column detectors of this prior only sense the presence of a gas analyte and has very limited ability to distinguish between different analyte molecules, in contrast to the disclosed analyzer which has a spectroscopic detector. The information output from this on-column detector is used to route the gas flow from the first GC column to multiple second GC columns. However, this information is based more on the occurrence of an analyte detection event rather than on chemical-specific characteristics, such as absorption spectrum, of the constituents in the detected pulse of analyte mixture from the first GC column. Thus this prior approach would distinguish only poorly whether that detected pulse comprises a mixture of many co-eluding compounds, only several co-eluding compounds or a single compound. The kind of control implemented in the prior systems only select among several second GC columns based on which of those GC column is already being used to perform a separation. In contrast to this prior analyzer, the control in some embodiments of the present analyzer is based on the estimated contents of the output of the first GC column, to select specific portions of the output from the first GC column to undergo additional separation by a second GC column. The inventors are not aware of any prior instruments based on combining gas chromatography and infrared absorption spectrometry that re-circulate the gas-phase output from the optical spectrometer to another mixture-separation column of the gas chromatograph, in accordance with some embodiments.

BRIEF DESCRIPTION OF THE INVENTION

In one aspect the present invention provides a gas-phase chemical analyzer comprising at least one gas chromatography column in gas-flow communication with at least one gas carrying tube of an optical absorption cell, a laser for illuminating molecules in a gas mixture flowing though said at least one gas carrying tube of the optical absorption cell, a photodetector for measuring absorption spectra of the gas mixture illuminated by said laser, a first module for statically identifying particular molecules in said gas mixture from other molecules in said gas mixture and a second module for comparing at least selected ones of the particular molecules in said gas mixture with a reference library of absorption spectra of previously identified molecules and for determining the likelihood of a correct identification of the particular molecules in said gas mixture and the previously identified molecules in said reference library.

In another aspect the present invention provides a method for analyzing gases comprising: collecting and concentrating a mixture of analytes and injecting that mixture as a short temporal pulse into a gas chromatography column that is part of a gas chromatography module comprising multiple gas chromatography columns; using the gas chromatography module to separate or partially separate the analytes in the mixture and coupling the analytes into a tube of an infrared absorption spectrometry module; using the infrared absorption spectrometry module to measure the infrared absorption spectrum of the analytes in the tube of the infrared absorption spectrometry module, generating absorption spectrum data corresponding to the measured infrared absorption spectrum, and supplying that absorption spectrum data to a blind source-separation module; using the blind source-separation module to produce one or more component spectra derived from the absorption spectrum data and supplying the component spectra to a spectrum modeling and identification module; and using the spectrum modeling and identification module to compare component spectrum supplied by the blind source-separation module with one or more reference spectra in a reference-spectra library module and determining a degree of correspondence between the component spectrum and the one or more reference spectra.

BRIEF DESCRIPTION OF THE DRAWINGS

FIGS. 7($a$) through 7($c$) illustrate three embodiments of the adaptive chemical analyzer each of which include a gas-flow module (shown in the upper portions of these figures) and a photon-flow module (shown in the lower portions of these figures).

FIG. 8($c$) depicts an embodiment where the light output from the absorption cell is de-multiplexed into the four separate spectral ranges (corresponding to that of four LWIR lasers and then coupled to four corresponding up-conversion detectors.

FIGS. 11($a$)(1) thru 11($a$)(4), FIGS. 11($b$)(1) thru 11($b$)(4), and FIGS. 11($c$) and 11($d$) exemplify the algorithmic de-mixing accomplished by ICA, showing, characteristic spectra of the four compounds in the mixture in FIG. 11($a$)($a$)(1)-(4), the de-mixed component spectra produced by ICA in FIG. 11($b$)(1)-(4) and the dependence of identification accuracy on detector noise in FIGS. 11($c$) and 11($d$).

FIGS. 12($a$), 12($b$) and 12($c$) illustrate the molecular absorption spectra in graphs of FIG. 12($a$), the GC-column elution pattern in FIG. 12($b$) and spectral reference library in FIG. 12($c$) for this simulation example. FIG. 12($d$) illustrates the dependence of the probably of detection (Pdet) vs. the noise level of the photodetection process.

FIGS. 13($a$), 13($b$) and 13($c$) illustrate the molecular absorption spectra for ten analyte compounds output from the GC module into the tube of the infrared absorption cell in FIG. 13($a$), the temporal distribution of those ten analyte compounds as they are coupled into the tube of the infrared absorption cell in FIG. 13($b$), and four additional spectra in the reference spectrum library having characteristic features that are similar to those of four analyte compounds in FIG. 13($c$).

FIG. 14($a$) is a comparison of results for full library and for reduced library of reference spectra, and FIG. 14($b$) shows the effect of detector noise when full library is used for the spectrum modeling.

DETAILED DESCRIPTION

Figure 1:
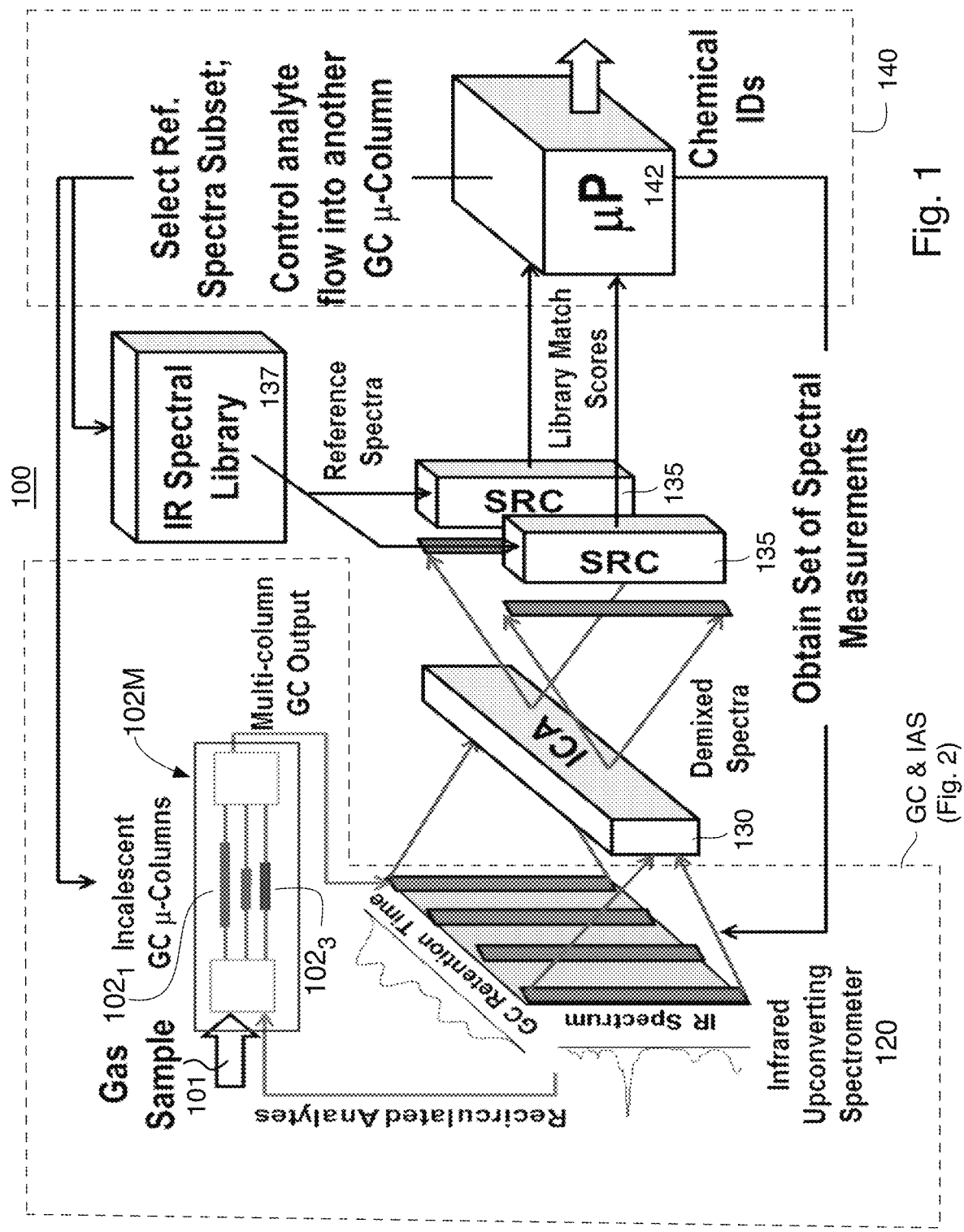
FIG. 1 is an illustrative block diagram of the adaptive chemical analyzer that includes gas chromatography columns and an Infrared Absorption Spectrometer module as well as spectral measurement and analysis modules

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

In some embodiments, the gas-phase chemical analyzer combines gas chromatography, infrared absorption spectroscopy and both statistical and library-based spectral analyses. The gas chromatograph (GC) includes a sampler/concentrator 105 and multiple mixture-separation columns 102. The sampler/concentrator 105 collects gas-phase molecules from an input port, which in some embodiments could be the ambient air, and injects the collected molecules into one (ore more) of the GC columns 102 as a short temporal pulse. The GC columns 102 physically separate the components in the mixture of chemical compounds comprising this injected pulse so that different components occur at different times in the output gas flow from a GC column 102.

The infrared absorption spectrometer (IAS), which comprises a gas-carrying tube 107 in the optical absorption cell 107C, the optical absorption cell itself (which could detect multiple passes of the light through the gas-carrying tube 107), the laser-beam coupling optics, the laser sources and the up-conversion photodetector 120, receives the continuous output of the GC columns 102 and produces a temporal series of measured absorption spectra of the molecules in that gas-phase output. Groups of the measured spectra are processed by a spectral analysis module that preferably executes both an independent component analysis (ICA) blind source de-mixing algorithm and a Sparse Reconstruction and Classification (SRC) library-based component identification algorithm. The results produced by the spectral analysis module may be used to control the flow of gas at the spectrometer's exit port back to an input of another (one or more) GC column(s) 102 or out to the exit port of the analyzer. Consequently, the spectrometer results obtained after a first separation of the original mixture of chemicals may be used to specify a second separation of a partially separated portion of the original mixture. In a typical operation of this analyzer, only a small subset of the output from the first GC column $102_1$ would need to be routed back to a second GC column $102_2$ for additional separation. Thus, the overall separation time for the GC and the overall power consumption of the IAS can be reduced compared to an analyzer that does not incorporate this spectrometer-in-the-loop control function. The spectral analysis done by the ICA and SRC algorithms can be executed more quickly than the speed of the gas flowing in the various gas flow tubes. If need be, one can add more length to the gas flow tubes if there is a need to delay when the gas reaches the flow controller 103 that switches the gas flows into a flow-wise subsequent GC column 102.

In various embodiments, the chemical identification algorithm of the disclosed analyzer attempts to reconstruct or model a given de-mixed spectrum produced by the blind-source separation independent component analysis (ICA) algorithm as a weighted combination of selected reference spectra that are stored in a library. In general, the accuracy of this identification process, done by a sparse representation-based classification (SRC) algorithm, can be improved by considering only those spectra in the library that are associated with the compounds in the actual mixture measured at a given interval of time by the IAS. When presented with a sufficiently comprehensive library of spectra, it may be possible for the SRC algorithm to reconstruct an ICA-produced spectrum from a combination of many reference spectra that are not representative of the chemicals in the actual gas mixture. This would be an erroneous result. So, in some embodiments, the present analyzer uses knowledge about the elution times of the chemical species output from its GC columns to determine which subset of possible chemicals, whose spectra are in the library, actually could be part of the gas mixture presented at a given time to the gas-carrying tube in the IAS. Only the subset of reference spectra associated with those chemicals are then considered by the chemical identification SRC algorithm in its spectral reconstruction. This pruning (or reduction) of the library considered at a given time by the SRC algorithm also reduces the processing time needed to execute that algorithm, which may be repeated as needed until a spectral reconstruction of sufficient quality is obtained.

As such, in some embodiments, the reference spectra library may be organized as multiple subsets of reference spectra. Different subsets of reference spectra may be associated with different separation columns of the gas chromatograph. Also, different reference spectra of a library subset may be ordered according to the elution time of their corresponding chemical compounds eluted or output from the associated gas chromatography column.

In some embodiments, the disclosed analyzer can produce a near-real-time identification of the output from the GC columns using the measured spectra collected while a gas mixture pulse is flowing through the gas-carrying tube 107 of the optical absorption cell 107C in the IAS. In contrast, prior art GC-MS ant GS-IAS analyzers must perform their analysis only after all GC separations and any MS measurements are completed, when the full set of data has been obtained. This is done in order to make use of the higher-order GC-MS discrimination afforded by certain chemometrics algorithms to distinguish between the many possible species that may be in the mixture and associate the measured mass spectrum with a combination of the possible reference spectra in the library. Unlike such prior analyzers, the present analyzer can do its chemical identification in near-real-time. The results of that identification can be used to adaptively control the flow of gas into additional columns 102 of the GC.

In some embodiments, the disclosed analyzer uses two different molecule discrimination modalities—GC and IAS—to provide positive identification of the various chemical species in an input gas mixture. Also, in various embodiments, this analyzer uses one or more of three different means—the GC columns, the blind-source de-mixing algorithm and the library-matching identification algorithm—to separate the different chemical species in the gas mixture so that they can be identified. The GC columns may perform the physical separation of the molecules according to bulk properties of the molecules, such as boiling point (which is influenced by the molecular weight) and the polar nature of the molecules. Some of the multiple GC columns in this analyzer may be designed to be selective for a chemical property, such as boiling point, and other GC columns may be designed to select according to the polar nature of the molecules, thereby providing additional discrimination of different chemical species by sensing multiple chemical bulk properties. Mid-infrared absorption spectra measured by the IAS may correspond to the vibrational and/or rotational resonances of the molecules and are indicative of the specific chemical bond types and bond locations in the molecule. Since these various modalities are based on essentially orthogonal molecular properties, the discrimination achieved with the combination of GC and IAS may be enhanced.

In some embodiments, the disclosed chemical analyzer can have much better selectivity (for mixtures) and also more accurate chemical detection than prior art analyzers that are based only on gas chromatography or only on infrared absorption spectroscopy. Some prior chemical analyzers use gas chromatography with an array of detectors that selectively collect specific chemical or classes of chemicals that adhere to those detectors. These array detectors require the GC to produce almost complete separation of the mixtures. Other prior chemical analyzers are based on a combination of gas chromatography and mass spectrometry. Mass spectrometry is a preferred "detector" for the output from a gas chromatograph because it can sense many aspects of the molecules in that output, thereby allowing the GC to produce only partially separated mixtures. Mass spectrometry, however, considers the fragments of a molecule that are formed by some means and the mass and electrical charge of those fragments—and thus destroys those molecules so that additional chromatographic separation of mixtures cannot be done. Infrared absorption, likewise, can consider many properties of a molecule since each molecule can have characteristic vibration and rotational resonances at many different energies or wavenumbers. Because these vibrational/rotational resonances are associated with the chemical bonds in those molecules and also with the bond locations, they are more indicative of the chemical behavior of the molecules. A benefit of IAS that is used to advantage in some embodiments of the present invention is that IAS preserves the molecules intact, unlike mass spectrometry. In some embodiments, the disclosed analyzer can use the analytical results on the quality of an identification done by SRC to determine whether to route a portion of the gas-phase mixture of analytes to a second GC column for additional chromatographic separation and select which second GC column (e.g., having a stationary phase whose retention is based on a different molecular property or whose retention covers a different range of boiling point temperatures) to use.

In some embodiments, the disclosed analyzer can separate, identify and quantify the various constituents of complex mixtures of gas-phase analytes whose relative concentration levels can cover a very large range of values. For various embodiments, the disclosed chemical analyzer does not require the GC columns to completely or almost completely separate the components in an input mixture. Instead, the independent component analysis (ICA) de-mixing algorithm of the disclosed analyzer can benefit from incomplete separation by the GC columns and makes use of the time-dependent changes in the relative concentrations of the compounds in a partially separated mixture to algorithmically separate the infrared absorption spectral component corresponding to those compounds, without needing to know what those individual spectra look like. It only assumes that the detailed features in the absorption spectrum for each compound are characteristic of that compound and do not change from one measurement to the next. Only the overall strength of the entire compound-specific spectrum changes, as the concentration of that compound changes. Thus, unlike prior analyzers based on GC, which seek to fully separate the components in a mixture, the ICA algorithm of some embodiments of the present analyzer makes use of incompletely separated mixtures. The allowable range of concentration values in the mixture may be constrained by the dynamic range of the photo-detection unit in the disclosed IAS. Some embodiments of the photo-detection unit in the disclosed IAS for absorption of long-wave infrared (LWIR) light make use of an infrared up-conversion detector that can achieve a dynamic range of $10^5$ or larger even for room-temperature, un-cooled operation. Other embodiments use photo-detectors that directly detect the LWIR photons and that are cooled by thermo-electric coolers (to temperatures as low as 200K) or even cooled to liquid nitrogen temperatures (~80K). The dynamic range for these cooled photo-detectors can be as large as $10^4$. Simulations which have been performed indicate that various embodiments of the disclosed analyzer can handle mixtures having a relative concentration (or abundance) range that is 10% of the detector dynamic range, for complex mixtures of more than five simultaneously occurring analyte compounds output from the GC columns. Also, various embodiments of the disclosed analyzer can handle an analyte concentration range as high as 100% of the detector dynamic range for mixtures with fewer simultaneously compounds. In contrast, the GC-MS systems can handle large concentration ranges, e.g., $10^4$, only when the MS of those systems is under very high vacuum. Other chemical analyzers that employ ion-mobility spectrometers can handle a concentration range of only $10^3$.

The disclosed analyzer can be used to sense and identify many kinds of chemicals. Exemplary chemicals include volatile organic compounds, vapors from explosives, narcotics and by-products of their fabrication, hydrocarbon fuels, toxic industrial chemicals, etc. Lasers used to illuminate the tube in the IAS can be changed to cover the specific ranges of wavenumbers at which the molecules of interest have prominent infrared absorption features. Certain embodiments of the analyzer can be used for monitoring pollutants or for monitoring industrial processes such as curing, drying, combustion, etc. Other embodiments can be used for detecting products of biological processes or for analyzing human breath. So the disclosed analyzer also has relevance to areas of law enforcement, portal protection, security and surveillance.

Some embodiments of the spectrometer in the disclosed analyzer use an up-conversion detector of the light associated with the absorption spectrum. This up-conversion detector converts the intensity information in the long-wave infrared (LWIR) photons, which is determined from the absorption by the molecules in the gas-carrying tube of the IAS, to intensity information in short-wave infrared (SWIR) photons that can be detected by a low-noise photodetector operating without intentional cooling (such as by a thermoelectric cooler or in a liquid nitrogen environment). The up-conversion to SWIR photons can involve a non-linear optical sum-frequency generation (SFG) process or a non-linear optical difference-frequency generation (DFG) process. To obtain the high power of the pump light for producing this SFG or DFG process, the quasi-phase-matching (QPM) crystal in which the frequency conversion occurs may be placed within the optical cavity of the pump laser. A prior up-converter that likewise has the QPM crystal within the pump laser cavity converts photons of 1.55 µm wavelength to photons of visible (0.63 µm) wavelength with a pump at 1.06 µm wavelength (see M. A. Albota and F. N. C. Wong, "Efficient single-photon counting at 1.55 µm by means of frequency upconversion," *Optics Letters*, v. 2 9, p. 1449 (2004)). In contrast, some embodiments of the presently disclosed analyzer uses an up-converter that converts LWIR photons of 9-10 µm wavelength to photons of 1.32-1.34 µm wavelength with a pump at 1.55 µm wavelength, for an example of SFG. Likewise, an example of DFG would use a pump at 1.32 µm wavelength to convert the 9-10 µm wavelength to photons of 1.52-1.55 µm wavelength.

Turning now to FIG. 1, FIG. 1 is an illustrative block diagram of one illustrative embodiment of the presently disclosed chemical analyzer 100 which comprises a gas chromatography (GC) module 102M that includes multiple GC separation columns 102 (sometimes enumerated with subscripts, as in $102_1 \ldots 102_N$, to identify a particular column 102) and an infrared absorption spectroscopy (IAS) module. The IAS module is in the dashed line enclosure labeled GC & IAS in FIG. 1 and it is shown in greater detail in FIG. 2. The "recirculating analytes" path depicted in the dashed line enclosure of FIG. 1 includes the gas-carrying tube 107 (see FIG. 2) in the absorption cell 107C (see FIG. 3) and also some of the associated flow-controlling pumps and valves which are described in greater detail below with respect to FIG. 2. The IAS module not only includes the gas-carrying tube 107 in the optical absorption cell, the optical absorption cell 107C itself (which could produce multiple passes of laser light through the gas-carrying tube), the laser-beam coupling optics 139, the laser sources 134 and an up-conversion photodetector 120. Two possible embodiments of the up-conversion photodetector 120 are shown in greater detail by FIGS. 8(*a*) and 8(*b*)).

The chemical analyzer also preferably comprises spectral measurement and analysis (collectively "processing") modules, illustrated in FIG. 1. These spectrum processing modules preferably include a blind-source separation module (labeled "ICA" with a numeral 130 on FIG. 1) that executes an Independent Component Analysis (ICA) algorithm and a spectrum modeling and identification module (labeled "SRC" with the numeral 135 on FIG. 1) that executes a Sparse Representation and Classification (SRC) algorithm. The processing modules depicted on FIG. 1 also preferably include a time ordered reference spectra library (TORSL) which is labeled "IR Spectral Library" on FIG. 1. The IR Spectral Library module 137 provides a library or database of reference absorption spectra of the molecules to be detected by presently disclosed chemical analyzer 100. Each molecule to be detected by the presently disclosed chemical analyzer 100 may be represented by one or more absorption spectra in the library 137. It should be recalled that the SRC algorithm has been used in the past to identify human faces from a library (of pictures) of various human faces and in the library any given human might well have multiple representations of their face. When SRC is used with the present invention, there may be multiple representations of a particular molecular's absorption spectra in the library 137 since a particular molecular's absorption spectra may have been measured under slightly different conditions at different times, leading to slightly different spectra. The library 137 is preferably a database which may be organized according to the anticipated time sequences in which the molecules (if present in the gas sample 101) associated with those reference absorption spectra would be coupled out from the GC module 102M and into the IAS module.

The reader will note that two instances of the SRC module 135 appear on FIG. 1. The SRC module 135 is implemented by the previously discussed SRC algorithm and it is utilized for each output spectrum produced by the ICA module 130 so the SRC module or algorithm is apt to be used many times during the analysis of an gas sample 101. The SRC module 135 may be embodied as either a single instance of the SRC algorithm or as multiple instances of it. If there are multiple instances of the SRC algorithm, then the executions of the multiple instances of the SRC algorithm may be performed more or less concurrently by a single microprocessor 142 or other computing device. Alternatively, a single instance of the SRC algorithm could operate successively on each output spectrum produced by the ICA module 130. Thus, there may be one or multiple implementations of the SRC module 135. And even if there are multiple implementations of the SRC modules 135, each implementations or instance thereof may need to be called (utilized) multiple times.

Figure 2:
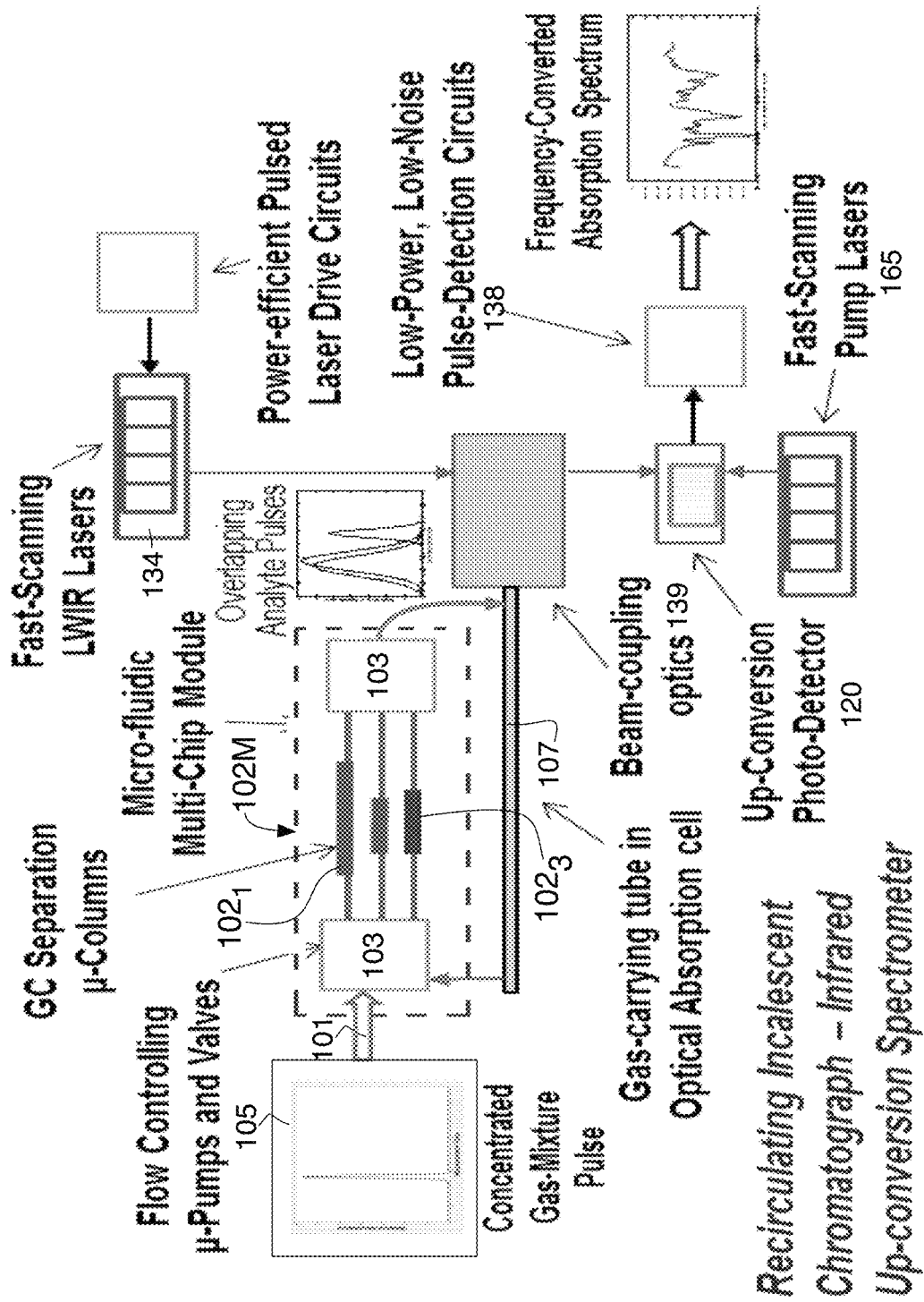
FIG. 2 is another block diagram, which, in this case, illustrates components of the Infrared Absorption Spectroscopy (IAS) module of FIG. 1 in greater detail.

The chemical analyzer of FIG. 1 preferably has a gas chromatography (GC) unit or module 102M (as illustrated in FIG. 2) that includes the multiple separation columns $102_1 \ldots 102_N$ (three separation columns are depicted for the embodiment of FIG. 1, so N=3 for this embodiment) and associated pump, valve and flow combiner and splitter elements 103. The chemical analyzer of FIG. 1 also has an infrared absorption spectrometer (IAS, shown in greater detail in FIG. 2) which includes the LWIR Quantum Cascade (QC) lasers 134, optical absorption cell 107C (and its gas-carrying tube 107) and the up-converting photon-detector 120. The chemical analyzer may include a concentrator 105 (which also is called the sampler/collector 105, see FIG. 2 for example) that collects gas mixtures to be analyzed by the analyzer. The IAS is sometimes also called an Infrared Upconverting Spectrometer.

The QC lasers 134 are denoted as being "fast scanning" since fast scanning of the mirror 132 that controls the wavelength (or frequency) of light emitted by a QC laser 134 is preferably fast enough for the full wavelength range of the measured spectrum to be scanned within the time needed to do a spectral measurement of the gas sample 101 so that the ICA algorithm or module 130 can process that measurement. Thus, the required scan time depends on the time duration of the partially de-mixed gas pulses output from the GC module 102M.

The associated pumps, valves and flow combiner and splitter elements 103 are sometimes grouped together in the drawings, and other times the individual elements thereof are specifically called out with pumps sometimes labeled $103_P$, valves or flow splitters sometimes labeled $103_V$ (and sometimes referred to as switching valves herein), flow combiners sometimes labeled $103_C$, and flow splitters sometimes labeled as $103_S$. The valves or flow splitters may be implemented as Dean's fluid switches which may have a port (not always shown on the drawings) to allow for the addition of clean carrier gas (or some other gas) to the sample then flowing thru the valve or flow splitter $103_V$. Traps $103_T$ may be optionally provided for cleaning the carrier gas.

In some embodiments, very small gas-phase molecules (such as $N_2$, $O_2$, $H_2O$ and $CO_2$) pass through the sampler/collector 105 and return to ambient air. If $N_2$, $O_2$, $H_2O$ and $CO_2$ are returned to ambient air then the larger molecules typically of interest are concentrated and retained in the sampler/concentrator 105 for a period of time. The sampler/concentrator 105 then may rapidly eject its contents in a short temporal pulse of a gas mixture 101 preferably containing larger molecules of interest. This pulse of gas mixture 101 then passes into the primary GC column $102_1$. The molecules in this gas mixture are called the analyte herein and may well include target compounds to be identified as well as background compounds, which may not need to be identified specifically. Molecules of different chemical species adhere to and are retained by the coating material (the stationary phase) of the primary GC column $102_1$ for different lengths of time before they detach from the GC column coating and are carried out of that GC column through the flow of a carrier gas (the mobile phase). The carrier gas typically is He, $N_2$ or $H_2$, but also may be dried air (that may also have molecules such as $O_2$ and $CO_2$ removed from it). As a result, different chemical species of analyte appear at the exit of the primary GC column $102_1$ at different times. In general, the analyte flowing out of the GC column, as carried by the carrier gas, occurs as a series of pulses of various temporal shapes and having various degrees of overlap with adjacent analyte containing pulses, and wherein different chemical species are present in those different pulses. The temporal pattern of the gas output from the GC columns 102 and coupled into the gas-carrying tube 107 of the absorption cell 107C is illustrated in FIG. 2 (see "Overlapping Analyte Pulses") and also in FIG. 10a.

A given analyte pulse output from the primary GC column $102_1$ and coupled (via associated pump, valve and flow combiner and splitter elements 103) into the tube 107 of the optical absorption cell 107C may still contain a mixture of multiple chemical species. This mixture may be quite complicated and may include five or more chemical species and have a very large variation in the relative concentration levels of those species. Different analyte pulses output from a GC column 102 may partially overlap each other, in time (see the graph of "Overlapping Analyte Pulses" of FIG. 2). Thus, a dynamic and rapidly changing gas-mixture environment is presented to the infrared absorption cell 107C from one moment to the next. The IAS (see FIG. 2) measures and records absorption spectra multiple times within the time duration of a given analyte gas-mixture pulse output from a GC column 102. This measurement involves the wavelength QC scanned lasers 134, the up-conversion detector 120 including the electronic processing circuits 138 at the output of the detector 120, and the micro-processor 142.

The various absorption spectra are presented to an algorithmic de-mixing processing module which implements a de-mixing algorithm 130. —One exemplary de-mixing algorithm 130. is independent component analysis (ICA). ICA, described in in the above-mentioned U.S. Provisional Patent Application Ser. No. 62/234,653 and in the above mentioned U.S. patent application Ser. No. 15/280,575, produces a set of de-mixed or partially de-mixed output spectra. The ICA algorithm 130 compares a set of multiple input absorption spectra, which preferably represent independent measurements of the gas-mixture, such as the absorption spectra recorded by the IAS module (see FIG. 2). the ICA algorithm 130 assumes that each chemical species in the mixture has at least one characteristic absorption spectrum. For different measured absorption spectra of a mixture, the relative concentrations of the species or molecules in that mixture vary from one measurement to the next. Thus, the ICA algorithm 130 may be ideally suited to the kinds of absorption spectra provided by the IAS module of FIG. 2 that is coupled to the output of the GC column 102.

Each de-mixed spectrum is preferably presented to an algorithmic spectrum-identification or classification processing module. One exemplary algorithmic spectrum-identification or classification processing module is the sparse representation-based classification (SRC) module 135 above. SRC is an algorithm that compares the input spectrum with a weighted combination of reference spectra that are stored in the library or database 137. The weighting and combination may be linear or non-linear. Also, in some embodiments of the disclosed chemical analyzer, portions of the spectra (i.e., certain subsets of wavenumbers) are considered and other portions can be ignored. This allows the SRC module 135 to de-emphasize or even to ignore effects of clutter or of measurement artifacts.

The library or database 137 of reference spectra is preferably organized to match the time varying output of analyte species from each of the GC columns 102, based on the column's analyte-retention characteristics. A specific chemical species is expected to be output from a GC column 102 only over a certain interval of time. Different chemical species may be output from the GC column 102 in different intervals of time. Thus, at each instance of time in which the SRC algorithm 135 is accessing the library or database 137, preferably only a subset of all of chemicals (molecules) in the reference library or database 137 which might be output from the GC column 102 at that time and would need to be considered by the SRC module 135. Reducing the number of reference spectra to be considered by the SCR algorithm 135 at a given evaluation time of a partially de-mixed component absorption spectrum provided by the ICA algorithm 130, will reduce the possibility of an incorrect chemical identification.

In some embodiments (see FIG. 3), certain selected gas-mixture pulses output from a primary GC column $102_1$ can be routed to another, secondary GC column (column $102_2$ through $102_5$, depending on fluid switch positions in elements 103) for additional separation. In the embodiment of FIG. 4, the primary and secondary columns each comprises multiple columns 102.

Figure 15:
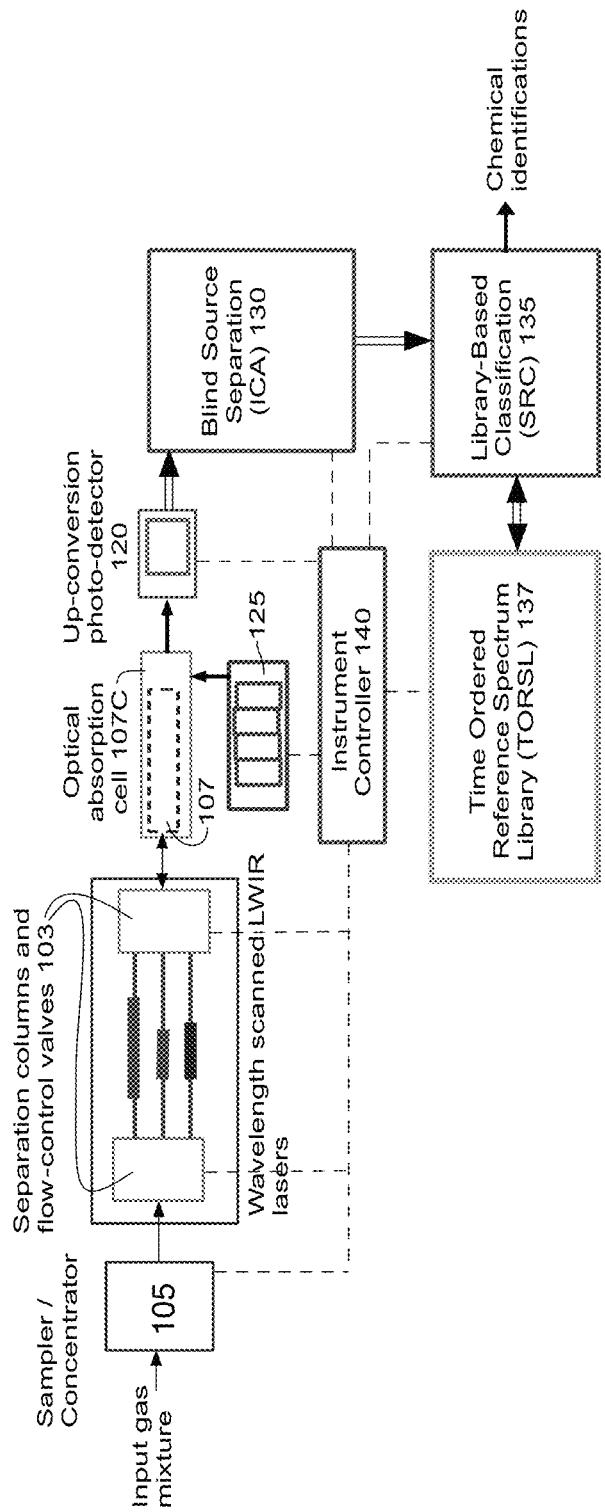
FIG. 15 is a block diagram illustrating the gas-phase analyte molecule paths (relatively thin solid lines), laser-light paths (relatively thick solid lines) and spectral data paths (double lines) as well as the control-signal paths (dashed lines) of the adaptive chemical analyzer.

In some embodiments, this re-routing can be triggered by the result of the SRC algorithm 135 evaluation as controlled by instrument controller 140 (see also FIG. 15). For example, if a candidate reconstruction spectrum produced by the SRC algorithm 135 as a weighted combination of reference absorption spectra still does not have an acceptable match to the ICA algorithm 130 produced spectrum, this result could indicate that the de-mixing achieved by the combination of the first GC column $102_1$, the application of the ICA algorithm 130 and the application of the SRC algorithm 135 are not sufficient. That gas mixture pulse would then be routed to a second GC column $102_2$, which may be coated with a different material (or stationary phase), for additional analysis by another application of the ICA algorithm 130 and another application of the SRC algorithm 135. If the result of re-application of the ICA algorithm 130 and re-application of the SRC algorithm 135 to the gas mixture is still not sufficient, then the gas mixture pulse may then be routed to yet another GC column 102 which may be coated with yet a different material (or stationary phase), for further analysis by additional applications of ICA algorithm 130 and the SRC algorithm 135.

Figure 3:
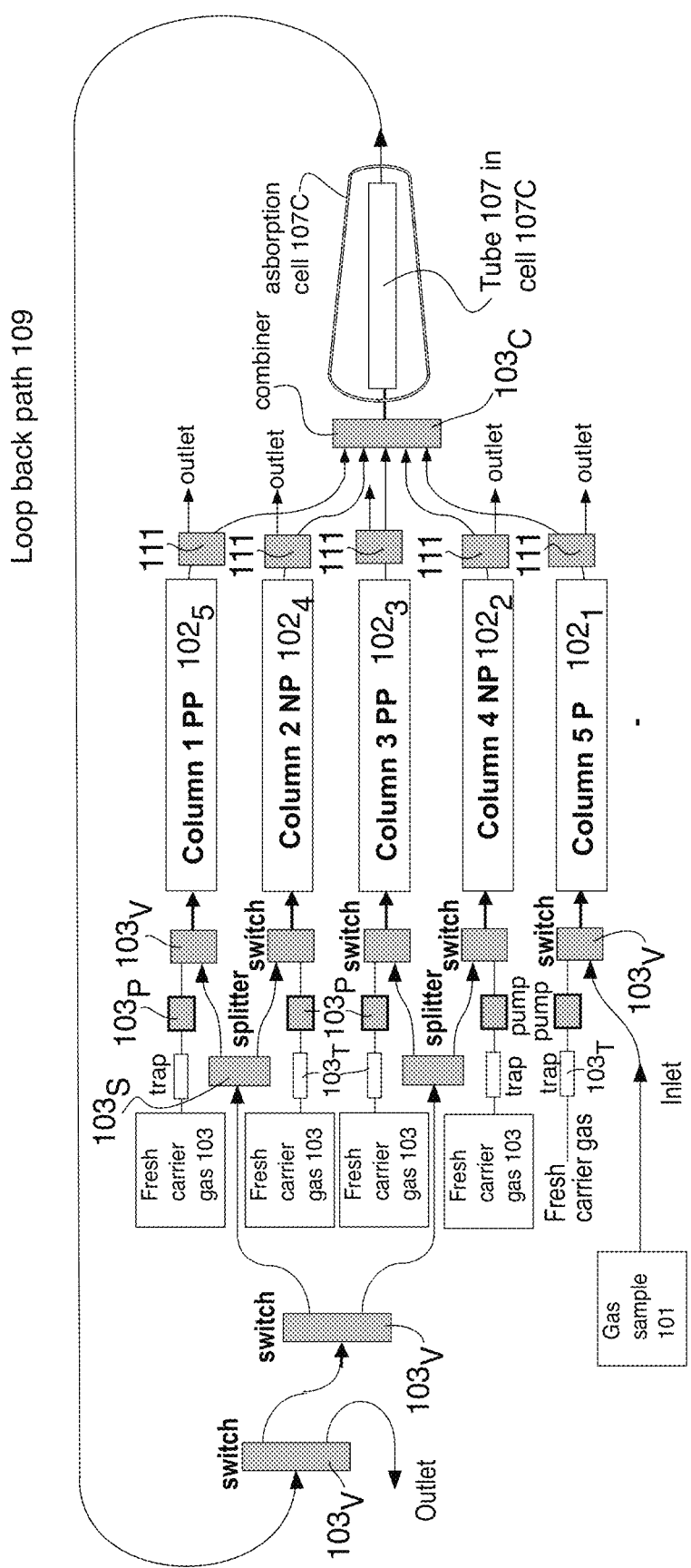
FIG. 3 depicts an example of a gas-flow module having multiple parallel gas chromatography columns with a single loop-back path.
Figure 4:
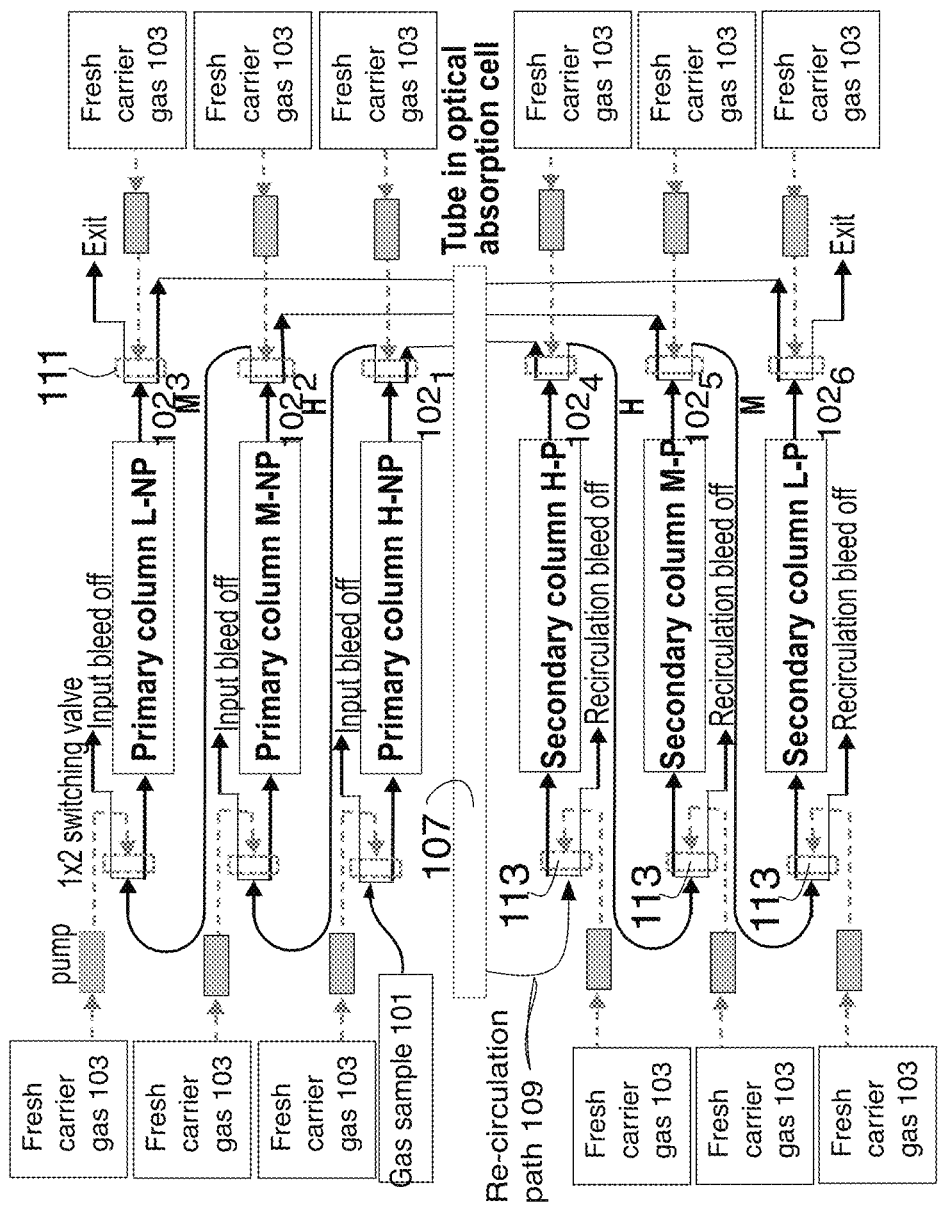
FIG. 4 depicts an embodiment of a gas-flow module having multiple loop-back paths.
Figure 5:
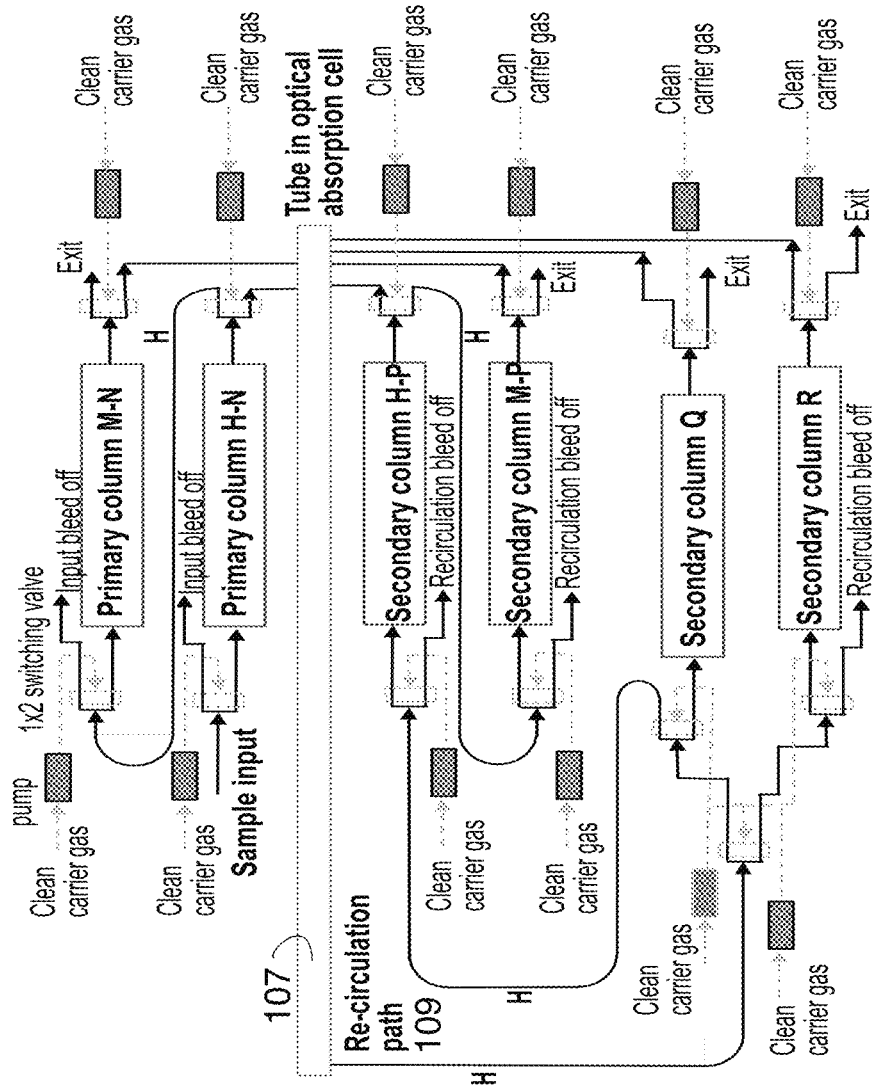
FIG. 5 depicts another embodiment of a gas-flow module having multiple loop-back paths.

On FIGS. 3 through 5, the label P stands for polar, the label NP stands for non-polar, and the label PP stands for very polar. The label L-NP stands for low boiling point, non-polar; the label M-NP stands for medium boiling point, non-polar; and the label H-NP stands for high boiling point, non-polar. These labels describe the kinds of stationary phase material (e.g., coating) that are or may be preferably used in the gas chromatography columns 102. Different columns preferably have different stationary phase coatings or constructions and particular embodiments may use different stationary phase materials or different combinations of stationary phase materials than those depicted by these figures. The particular coatings used in the various GC column 102 will likely differ from one another, but the particular coatings selected is a matter of design choice. The labels noted above and found on FIGS. 3-5 provide just one possible guide for coating selection.

In some embodiments (as depicted by FIGS. 3-5), the output gas from both the first (or primary) GC column $102_1$ and the second (or secondary) GC column $102_2$ (or even more or different secondary columns 102, if desired) are combined together and coupled to the gas-carrying tube 107 of the optical absorption cell 107C via a loop back path 109, for measurements of the absorption spectrum of that mixture and for processing by the ICA algorithm 130 and the SRC algorithm 135 of the measured spectra. In this case, the spectra that would need to be considered by the SRC algorithm 135 at a given instance in time should include the chemicals that might be output from both (or more) GC columns 102. Thus, multiple subsets of the spectral library 137 would be considered at a given time by the SRC algorithm 135 for generating the weighted combinations.

For example, as illustrated by the embodiment of FIG. 3, the output of one of the GC columns (a primary column, in this case Column 5P) is supplied to the tube 107 of the optical absorption cell 107C and the output of the absorption cell 107C is then supplied to the a secondary GC column via loop back path 109. A set of switching valves $103_V$ select one of four possible secondary GC columns (Column 1 PP, Column 2 NP, Column 3 PP or Column 4 NP) to receive the output from the absorption cell 107A. The output from the selected secondary GC column is then coupled again to tube 107 the same absorption cell 107A. In this way, the outputs from both the primary GC column $102_1$ and a selected secondary GC column ($102_2$ thru $102_5$) are both coupled to the same absorption cell 107C. Which secondary GC column ($102_2$ thru $102_5$) is the selected secondary column depends on the positions of valves/fluid switches $103_S$ depicted on FIG. 3.

FIG. 4 illustrates an embodiment for which the output from a first GC column (Primary column H-NP) can be coupled directly to a second GC column (Primary column M-NP) without going through the optical absorption cell 107. The outputs from a combination of multiple GC columns can be coupled to the absorption cell 107. Whether the output flow from a given GC column is coupled at a given instance to the tube 107 of the absorption cell 107C is determined by a switching valve 111 that directs the output flow to the tube 107 of the absorption cell or to an exit port. The output from the absorption cell 107 may be coupled to a set of secondary GC columns. The spectra measured by the absorption cell 107 are evaluated to determine whether to couple the output present at a given time to the set of second GC columns or to a recirculation bleed-off port by switch 113. This evaluation also is used to select the particular secondary column to use for the additional chromatographic separation.

The embodiment illustrated by FIG. 5 combines features present in both FIGS. 3 and 4. Consider Primary column H-N and Secondary column H-P, the output flows from both of these columns can be connected to the absorption cell or to Primary column M-N and Secondary column M-P, respectively. These flows are controlled by the switching valves (indicated by the blue dashed boxes). These switching valves may implemented by a Dean's switch. In a Dean's switch, the gas flow to be controlled does not pass through either the valve or the pump. Instead, the flow of the carrier gas supplied through the pump controls the direction of flow for the gas from column or from the absorption tube. As shown in the figure, some of the Dean's switches provide a means to add make-up carrier gas into the absorption cell, which may be desirable when the cross-sectional area of the absorption cell tube is larger than the cross-sectional area of a GC column.

Figure 6A:
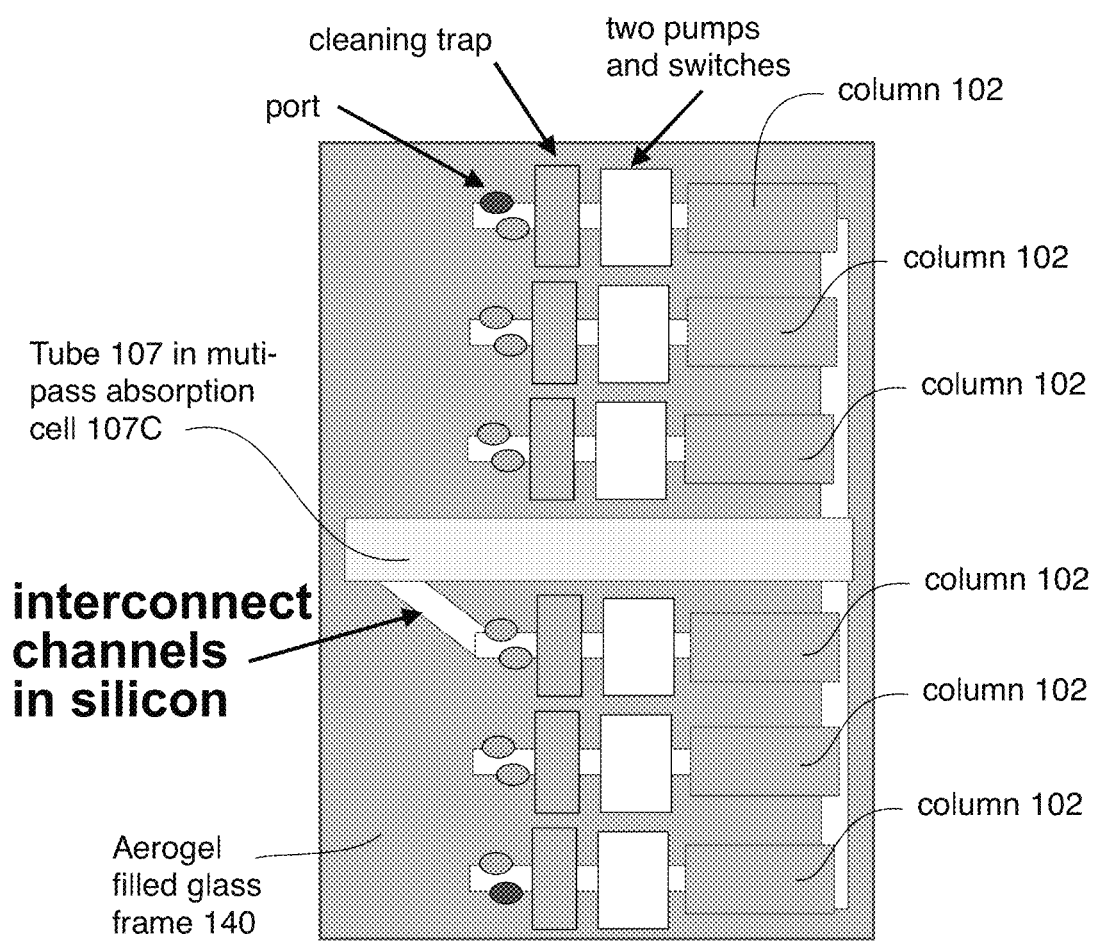
FIGS. 6($a$)-6($c$) depict the Integrated module of multiple micro-fluidic chips, with FIG. 6($a$) comprising a top view showing arrangement of GC-column chips, pump-valve chips and interconnection channel chips, FIG. 6($b$) comprising across-sectional view of base containing multiple interconnection-channel chips, and FIG. 6($c$) providing a perspective view of components in a glass enclosure.

In some embodiments, the various columns and pumps, and other components of the GC and also the IAS can be assembled together as a micro-fluidic multi-chip module (MFMCM). FIG. 6(a) depicts a top view of an integrated module of multiple micro-fluidic chips, showing n arrangement of GC-column chips, pump-valve chips and interconnection channel chips, FIG. 6(b) is a cross-sectional view of base containing multiple interconnection-channel chips, and FIG. 6(c) perspective view of components in a glass enclosure.

Figure 6B:
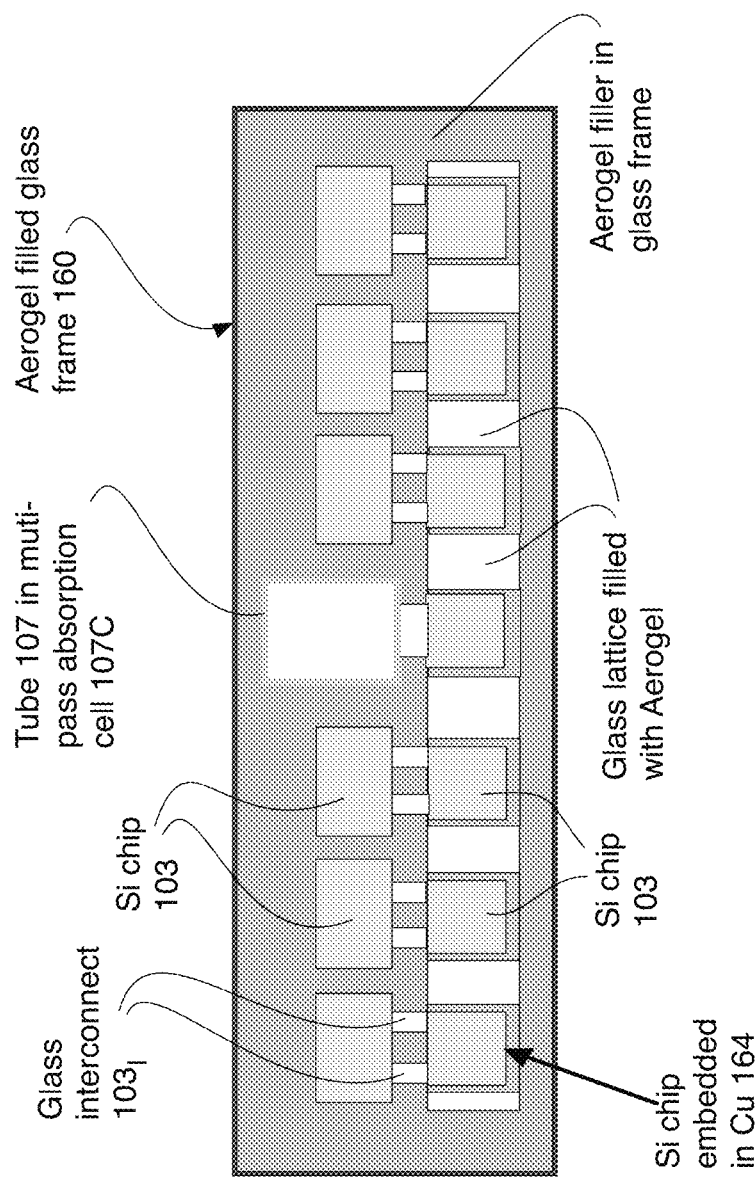
Figure 6C:
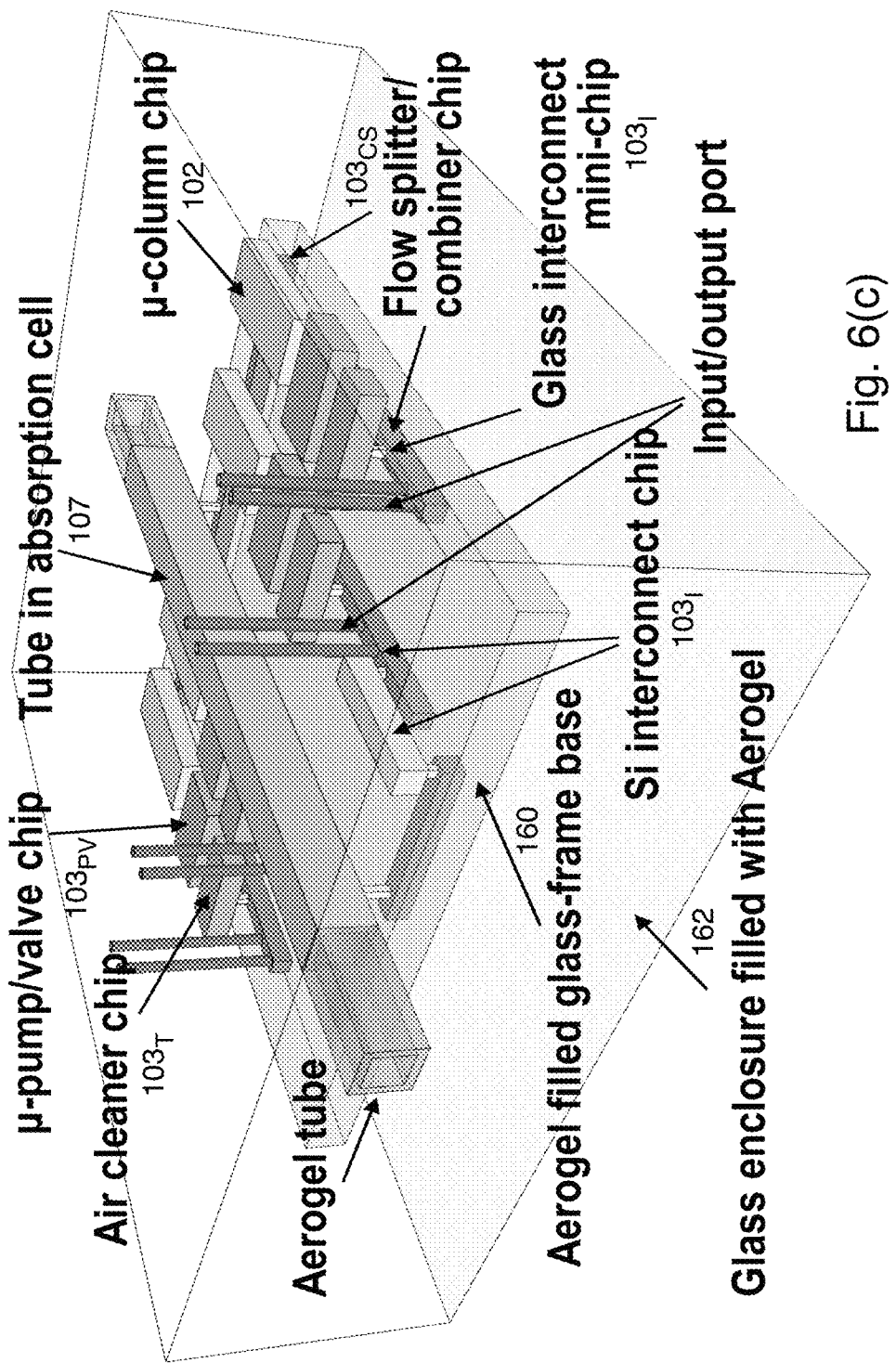

An exemplary module, illustrated in FIGS. 6(a), 6(b), and 6(c), comprises a base piece 160 that contains fluidic interconnect lines. A pump $103_P$ and a valve $103_V$ are grouped together as a chip $103_{PV}$ in these and other figures while a splitter $103_S$ and a combiner $103_C$ are grouped together as a chip $103_{CS}$ in these and other figures. The various chips, collectively labeled 103 in FIG. 6(a), are mounted onto this base 160, which provides the interconnections between those chips. The various chips, besides those already mentioned, can include traps $103_T$ (for cleaning the carrier gas), a glass or silicon interconnect mini-chip $103_I$ and GC-separation columns 102. Also, the base 160 itself may comprise multiple chips. The Si chips are sometimes simply labeled 103 in some views.

FIGS. 6(a), 6(b), and 6(c) illustrates that base 160 may comprise multiple silicon chips 103 and multiple GC-separation column chips 102 that are embedded in a silica (or glass) lattice framework 162. The silicon chips 103 are preferably attached to the silica framework 162 with plated copper 164, which fills the space between the outer edges of a silicon chip 103 and the silica framework 162 surrounding that chip 103. The other spaces in the silica framework can be filled with aerogel. For some gas chromatography applications, it is desirable to heat the fluidic interconnection lines to a temperature that is at least as high as the temperature of the GC columns 102. This heating of the interconnection lines may minimize the retention of the gas analyte molecules by the interconnection lines. Ideally, all of the retention should occur in the GC columns 102. Short interconnect segments join an interconnect-line containing silicon chip in the silica framework to silicon chips that may contain the GC columns 102, the pumps and the switching valves $103_{PV}$, and other interconnect lines. Some of these silicon chips, such as chips containing the GC separation columns 102, may be heated. It is desirable to keep those heated chips thermally isolated from the un-heated chips.

Thus, the size of the fluidic interconnect pieces between those chips should preferably be minimized to reduce the amount or volume of gas analyte molecules to be heated. The gas-flow carrying tube 107 of the absorption cell 107C also may be mounted onto the MFMCM, through other small interconnect pieces. The MFMCM can be located in a glass frame 160 that itself is filled with aerogel. In this way, the various heated chips can be kept thermally isolated from the ambient environment. The combination of small chip volume and thermal isolation by means of the aerogel filling, which has very low thermal conductivity, may ensure the heat supplied to the silicon chips is used to effectively change the temperature of those chips rather than the temperature of the surroundings.

In some embodiments, the chemical analyzer can comprise a gas-molecule flow module and a photon flow module, two embodiments of which are illustrated by FIGS. 7(a) and 7(b). The gas flow module (shown in the upper portion of these figures) preferably includes a sampler/collector 105, which may also serve to concentrate the sampled gas mixture, multiple separation columns 102 and a gas-carrying tube 107 in an optical absorption cell 107C. The photon flow module (shown in the lower portion of these figures) comprises one or more quantum cascade (QC) lasers 134 that supply light to the optical absorption cell 107C, a multi-pass optical cell that causes the laser light to make many passes through the gas-carrying tube 107 of the optical absorption cell 107C and a photo-detector 122 of the light output from the optical absorption cell 107C.

MOEMS turning mirrors 132 are grating reflector mirrors whose tilt angle is changed to change the wavelength of the light produced by an associated QC laser 134. The combination of the QC gain chip 133, the MOEMS turning mirror 132 and the output mirror 136 (located at the opposite end of the gain chip 133) comprise an external cavity wavelength tunable laser 134, the quantum-cascade laser source. Four QC lasers 134 are depicted in the embodiments of FIGS. 7(a) and 7(b).

Note that the embodiment of FIG. 7(b), compared to the embodiment of FIG. 7(a) has multiple recirculation paths 109 (individually labeled $109_1$ and $109_2$). So in some embodiments, such as that depicted by FIG. 7(a) a single recirculation path 109 couples some of the gas output from a GC column 102 into another GC column 102 for additional chromatographic separation of the constituents in a mixture while other embodiments may have mire than one recirculation path 109. For various embodiments, all components that lie between the output of a first column 102 and the input of a second column 102 and through which the molecules output from the first column flow before reaching the second column may be considered part of the recirculation path 109. Thus, the tube 107 in the optical absorption cell 107C could be considered part of the recirculation path 109. Additional components that may be part of the recirculation path include various valves and pumps $103_{PV}$ (see also FIGS. 7(a) and 7(b)), switches and/or flow combiners $103_{CS}$, Deans-switch valve configurations (the 1×2 switching valves $103_\Gamma$ shown in FIGS. 4 and 5) and additional gas-carrying tubes (shown in FIG. 3-7(b)). The valves, pumps and additional gas-carrying tubes could be located between the first (or primary) GC column $102_1$ and the tube in the optical absorption cell 107C. Also, the valves, pumps and additional gas-carrying tubes could be located between the tube 107 in the optical absorption cell 107C and the second GC column $102_2$. Typically, the gas-flow combiner $103_{CS}$, if present, would be located between multiple GC columns 102 and a common tube 107 in the optical absorption cell 107C and my be combined with the pump/valve combination 103PV shown at the output of the columns 102. The gas-flow combiner $103_{CS}$ may be equipped with valves and pumps as needed. However, a gas-flow combiner $103_{CS}$ may be omitted if the optical absorption cell 107C has multiple tubes 107. For example, see the embodiment of FIG. 7(c) where each column $102_1 \ldots 102_3$ is associated with a separate tube $107_1 \ldots 107_3$ in the optical absorption cell 107C. The embodiment of FIG. 7(c) depicts three columns 102 and three associated tubes 107, but it should be appreciated that embodiments with more or fewer column 102/tube 107 combinations are certainly useful. Additionally, some embodiments may have more than one optical absorption cell 107C. The cross-sectional area of the single tube 107 shown in FIG. 7(a) may be about the same as the sum of the three cross-sectional areas of the three tubes $107_1 \ldots 107_3$ shown in FIG. 7(c), so the laser light from QC laser 134 would overlap all three tubes $107_1 \ldots 107_3$.

In some embodiments (such as in the embodiments of FIGS. 7(a) and 7(b)) more than two GC columns 102 are coupled to the same tube 107 of the optical absorption cell 107C. When the outputs from multiple (two or more) GC columns 102 are coupled to the same tube 107 of the optical absorption cell 107C, the gas flow through that tube 107 generally would be the combination of the gas flows through the individual GC columns 102 that feed the tube. If some of these multiple GC columns 102 do not have analyte molecules flowing through them at a given time interval, the flow of only carrier gas contributed by those "inactive" GC columns will dilute the relative amount of analyte molecules flowing in the tube 107 that are coupled into the tube 107 from the "active" GC columns 102 which have analyte molecules. The valve and pumps $103_{PV}$ located between the outputs of the GC columns 102 and the input of the tube 107 can be adjusted (or timed) to divert some of the gas from some (the 'inactive') GC columns 102 away from the tube 107 and to select the gas from other (the 'active') GC columns 102 to couple into the tube 107. The valve and pumps $103_{PV}$ located between the output of the tube 107 and the inputs of the GC columns can be adjusted to route the output of the tube 107 to a specific GC column (or GC columns) 102 or to divert that output to some exhaust or bleed off port. These timing and routing considerations may be simplified somewhat if each column 102 is associated with one tube 107 as in the case of the embodiment of FIG. 7(c).

The gas-carrying tube 107 in the optical absorption cell 107C preferably has a wall or walls comprising material that is transparent to the probe light produced by the LWIR QC lasers 134. In those cases, the optical absorption cell 107C can comprise multiple gas-carrying tubes 107 as noted previously, with each tube 107 coupled to a single GC column 102. For example, up to seven tubes could be arranged in a hexagonal close-packed configuration. Alternatively, four tubes, six tubes or even nine tubes could be arranged in rectangular-grid configurations. The probe light in the optical absorption cell 107C would propagate through multiple tubes 107, and preferably all of the tubes, for a suitable multi-pass cell design. "Multi-pass" refers here to the multiple passes of the laser light through the gas whose absorption spectra is being measured in the optical absorption cell 107C. A multi-pass cell 107C typically has mirrors at the two ends that reflect the light back and forth. The multiple passes occur at different times, but at the speed of light, which is essentially instantaneous compared to the flow of the gases in tube(s) 107.

In some embodiments, LWIR light from one or more QC laser sources 134 is coupled to the optical absorption cell 107C. The laser source 134 may be a tunable laser whose wavelength is tuned or scanned from one moment to the next. The laser light illuminates the analyte molecules in the gas flowing in one or more tubes 107 the absorption cell 107C. Certain wavelengths or wavenumbers of the light are absorbed by analyte molecules, with those wavelengths or wavenumbers corresponding to the vibrational resonances of those molecules. In general, this absorption of light can be described by Beer's law. The absorbance at a given wavelength or wavenumber is proportional to the number of molecules or the concentration of those molecules and to the interaction length of the light with the gas flow. The optical absorption cell 107C outputs a LWIR spectrum which is what results from the absorption of the LWIR light from the QC laser sources 134 by the analyte molecules in the gas-carrying tube(s) 107.

While a single-pass optical cell such as a hollow waveguide can be used, a "multi-pass" optical cell 107C can potentially provide a larger interaction length for the laser beam and greater change in the intensity of the light output from the cell for the same volume of gas in the tube 107 of the optical absorption cell 107C. Therefore a "multi-pass" optical cell is preferred for element 107C, although a single-pass optical cell may be used instead.

In some embodiments, the LWIR absorption spectrum of the gas mixture present in the optical absorption cell 107C can be detected by a LWIR photodetecting system, such as a photodetector made from HgCdTe material or such as a photodetector comprising an InAs/GaSb superlattice. LWIR photodetectors absorb the LWIR photons and thereby produce electrical charge carriers. However, the dark-current noise of prior art LWIR photodetectors is very high unless the photodetectors are cooled to temperatures of 220K or lower by means such as thermo-electric or cryogenic coolers. A prior art LWIR detector could be used in place of the elements forming the Up-Conversion Photon Detection System 120' (an improved embodiment of a photodecting system), depicted by FIGS. 7(a) through 7(c). But a Up-Conversion LWIR Photon Detection System 120' is better than a prior art LWIR detector since extreme cooling is not required. Two different embodiments of a Up-Conversion LWIR Photon Detection System 120' will now be described.

Figure 8A:
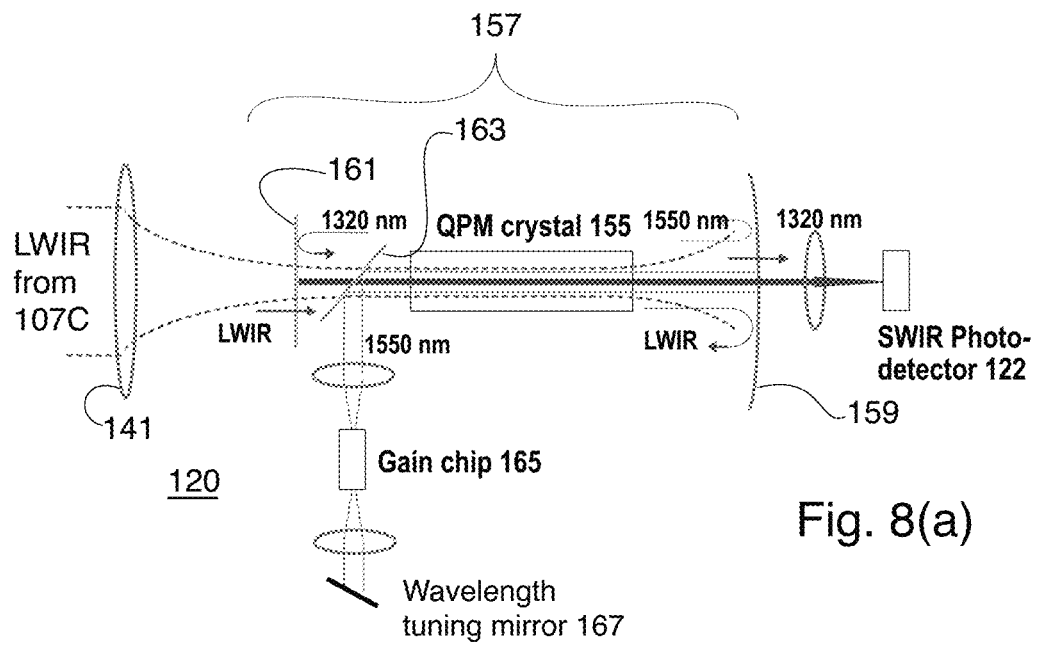
FIGS. 8($a$) and 8($b$) illustrate two different embodiments of an up-conversion detector.
Figure 8B:
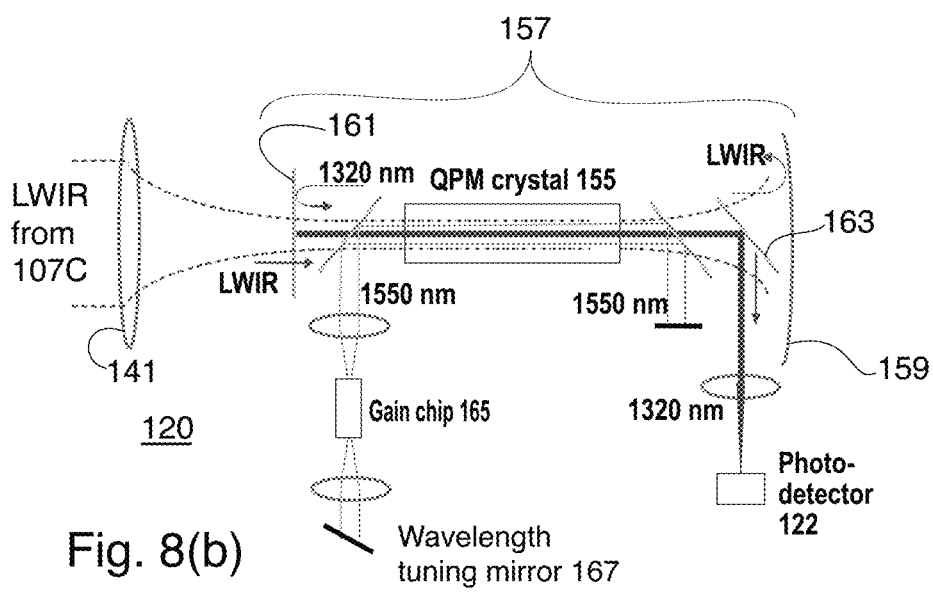
Figure 8C:
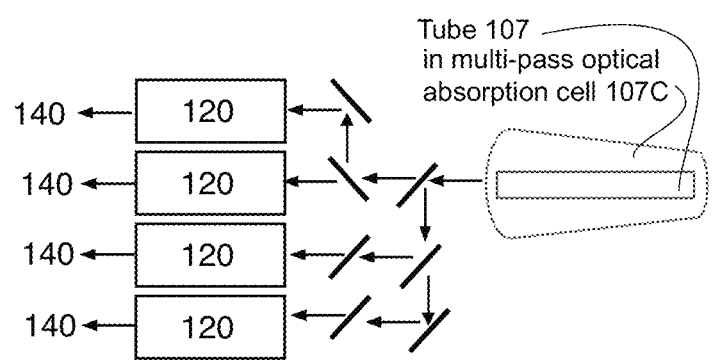

FIGS. 8(a) and 8(b) illustrate two different configurations or embodiments of an Up-Conversion LWIR Photon Detector System 120' and thus illustrate a different way to detect the LWIR absorption spectrum by translating or frequency up-converting to a different band of wavelengths the spectral information that is represented as a wavelength (or wavenumber) dependent light-intensity pattern. The up-conversion detector illustrated in FIGS. 8(a) and 8(b) translates the LWIR spectrum from the optical absorption cell 107C into the short-wave infrared (SWIR) band that can be sensed by a photodetector 122 made from InGaAs/InP material. SWIR photodetectors 122 have relative low dark-current noise when operated un-cooled at room temperatures. They also can maintain linear response even when the photo-generated current is quite high (>10 mA).

The up-conversion system 120' illustrated in FIGS. 8(a) and 8(b) include a non-linear optical quasi-phase-matching (QPM) piece or crystal 120 that is located within the resonance cavity of a laser that we sometimes call the pump laser or the frequency up-conversion cavity 120. To describe the operation of this up-conversion detector system 120', we consider the LWIR light from the optical absorption cell 107C which arrives at the up-conversion system 120', for example, via beam coupling optics 139 (and more particularly via an optional lens or mirror 141 thereof) as the input signal light to the up-conversion system 120' and the light to be detected by the SWIR photodetector 122 as the output light. A sum-frequency generation process is illustrated in the figure, for which the frequency (or photon energy) of the output light (at approximately 1320 nm) is the sum of the frequency (or photon energy) of the pump light (at 1550 nm wavelength) and the frequency (or photon energy) of the LWIR light (at a wavelength between 6 µm and 12 µm), for example. As illustrated, the various mirrors or splitter/combiners in the up-conversion detector are configured (typically with wavelength selective coatings) such that the pump light remains within the frequency up-conversion cavity 120 of the pump laser 165. The main loss of that light is through the frequency up-conversion process that occurs in the QPM piece or crystal 120. Thus, because the pump light remains in the resonator cavity, the intensity of the pump light can become very high. This high pump intensity improves the efficiency of the frequency conversion process for the absorption spectrum information carried by the LWIR photons into an equivalent wavelength dependent intensity pattern carried by the SWIR photons (at approximately 1320 nm) that are detected by the photodetector 122. The number of LWIR photons is generally substantially lower than the number of pump photons (typically <1%). Thus, the number of SWIR output photons produced by the up-conversion process in the QPM piece or crystal 120 is proportional to the number of LWIR signal photons.

In some embodiments of the up-conversion detector, the LWIR light and the pump light travel in the same direction through the QPM piece or crystal 120 and the generated SWIR light also travels in that same direction. The frequency or wavelength selective mirrors in the up-conversion detector are coated such that the LWIR light and the generated SWIR light both make two passes through the QPM piece or crystal 120 before exiting the frequency up-conversion cavity 157. The output mirror 159, located between the QPM piece 120 and the photodetector 122, reflects the pump light and also the LWIR light but passes the shortest-wavelength SWIR light. That output mirror 159 can be shaped to focus the LWIR light so that the waist of the LWIR beam coincides with the location of the QPM piece or crystal 120, to maximize the brightness of that LWIR light. The input mirror 161, located between the QPM piece 120 and the optical absorption cell 107C, reflects the SWIR light but passes the LWIR light. The pump beam and the generated SWIR beam can be quite collimated, in comparison to the LWIR beam, since their wavelengths are so much smaller. The three light beams are aligned for maximum overlap within the QPM piece 120. A mirror 163 located between the QPM piece 120 and either the input mirror 161 (see FIG. 8(a)) or the output mirror 159 (see FIG. 8(b)) reflects only the pump light but transmits the LWIR light and also transmits the SWIR light. This pump-coupling mirror 163 deflects and couples the pump light out of (or into) the common path of the LWIR and SWIR light and to the gain chip of the pump laser.

In some embodiments of the up-conversion LWIR photon detector system 120', the pump-coupling mirror 163 couples the pump light to a chip 165 that provides gain or optical amplification for the pump light. Photons of the desired pump wavelength (e.g. 1550 nm) are generated in this gain chip 165 and also the pump light is amplified as a result of stimulated emission in this gain chip 165. A grating mirror 167 that is coupled to the gain chip 165 selects the emission wavelength of the pump laser. The grating mirror can be moved or even scanned (rotated back and forth) to vary the pump-laser wavelength.

In some embodiments up-conversion LWIR photon detector system 120', one or more LWIR lasers 134 generate and emit the LWIR light that is coupled to the optical absorption cell 107C. These LWIR lasers 134 (see FIG. 7(a) through FIG. 7(c)) have a similar construction as the frequency up-conversion cavity or pump laser 157 in that they likewise may comprise a gain chip, a wavelength selecting grating mirror and one or more lens elements for coupling the light. If the LWIR laser 134 is implemented in the Littrow configuration, the grating forms one end of the optical cavity of the laser. For the LWIR lasers 134, the facet of the gain chip opposite the end of the chip facing the grating mirror can define the other end of the optical cavity. Other external-cavity configurations such as a Littman-Metcalf configuration or variants of the Littrow configuration in which the gain chip is moved to tune the laser-emission wavelength also could be used.

In some embodiments, the LWIR light and the pump light can emit continuously (in a continuous-wave or CW manner). In other embodiments, the LWIR laser and the pump laser emits a train of pulses. It is important that the LWIR pulses and the pump pulses coincide in time and spatial location and direction of propagation when those pulses travel through the QPM piece or crystal 120. Electronic drive circuits (not shown) for the pump laser 165 and the LWIR laser(s) 134 may be synchronized to ensure this condition. Also, the optical components, such as the mirrors, and also the path-lengths may be designed to ensure the temporal and spatial overlap of those laser pulses.

To produce an absorption spectrum, the emission wavelength for the light from each of the LWIR lasers 134 may be varied with time in a periodic manner. The time needed to complete a period of spectral scan (or a period of motion for the grating mirror 132 of the LWIR laser 134) should be shorter than the duration of the shortest analyte pulse output from the gas chromatography columns 102. Ideally, the time needed for the light to travel through the many passes through the multi-pass absorption cell 107C also is less than the minimum analyte pulse duration. The emission wavelength of the pump laser 157 can be constant over this spectral scan time. In that case, up-conversion spectral bandwidth for the QPM piece or crystal 120 should be designed to sufficiently cover the range of wavelengths emitted by the LWIR laser 134. Alternatively, the emission wavelength of the pump laser 157 can be varied as the wavelength of the LWIR laser 134 is varied, to maintain the desired phase-matching condition for the up-conversion process.

In some embodiments, the photodetector 122 produces a photocurrent whose magnitude preferably is proportional to the intensity of the SWIR signal light coupled to the photodetector 122. So the photodetector 122 preferably produces a pattern of photocurrent values that correspond to the transmittance spectrum associated with the gas-phase analytes in the tube 107. The photocurrent can be coupled to an electronic amplifier circuit 169, preferably embodied as a transimpedance amplifier (TIA), whose output is coupled to an analog-to-digital converter ADC 171. In some embodiments, the ADC 171 outputs a value, for each interval of time, that corresponds to the integrated photocurrent from the one or more pulses of SWIR light occurring in that time interval. The values output from the ADC 171 correspond to the absorption spectrum of the molecules in the absorption cell, since different ADC 171 output values are associated with different positions of the grating mirror (or mirrors) of the LWIR laser 134 (and also of the pump laser 157). In some embodiments, such as the one illustrated in FIG. 8, multiple LWIR lasers 134 that emit light in different spectral bands can have their outputs coupled or multiplexed together (via beam coupling optics 139) to form the beam or beams of light traversing the absorption cell 107C. The pulses of light emitted from one LWIR laser 134 (and its associated pump chip 133) preferably are staggered in time relative to the pulses of light emitted from another LWIR laser 134 (and its associated pump chip 133). In this way, for example, if each LWIR laser 134 produces light at a pulse repetition interval of 10 μsec, the light coupled with the gas flow in the absorption cell 107C has a pulse repetition interval of 2.5 μsec when the outputs from four LWIR lasers 134 are multiplexed together in an interleaved manner. Each pulse of this combined train of pulses corresponds to a different wavelength of LWIR light, over the period of a spectral scan. Another way to multiplex the scans could involve a sequential cascading of the scans from the four LWIR lasers 134. In this case, if each scan involves 200 pulses at a repetition interval of 10 μsec, the overall cascade of four scans would have a duration of 8 msec. A controller circuit identifies each laser pulse of the multiplexed pulse stream, and its photodetector pulse and associated output from the ADC circuit 171, with the corresponding wavelength to produce the measured absorption spectrum.

Assume, as an illustrative example, that light from four QC LWIR lasers 134 is multiplexed together to obtain a desired absorption spectrum of the molecules in the optical absorption cell 107C. A set of dichroic combiners in beam coupling optics 139 can be used to form the multiplexed beam or beams of light that is coupled to the absorption cell 107C, as illustrated in FIG. 7(a) through FIG. 7(c). In some embodiments, a polarizing combiner can be used to multiplex two beams of light whose spectral coverage overlap and thereby form a single beam of light that is then coupled into the absorption cell 107C. The light output from the absorption cell 107C can be kept in a single beam, or two beams, and coupled to an embodiment of the up-conversion detector 120.

Alternatively, the light output from the absorption cell 107C can be de-multiplexed into the four separate spectral ranges (of the four LWIR lasers 134) and then coupled to four corresponding up-conversion detectors. See the embodiment of FIG. 8(c). A set of dichroic splitters and a polarizing splitter (similar to the combiners used to accomplish the multiplexing) can be used to de-multiplex the light from the absorption cell 107C into four separate beams.

In some embodiments, the gas-chromatography columns 102 separate the different chemical compounds in a mixture into corresponding temporal gas-phase pulses. The chromatographically separated pulses of different compounds can have different temporal width and shape, depending on the interaction of those chemicals with the materials (such as the stationary phases) in the GC columns 102. This separation may not be complete and thus the pulse corresponding to a given compound may overlap the pulses corresponding to other compounds. Also, when the outputs from multiple GC columns 102 are coupled into the same absorption cell 107C, there could be even more overlaps between the pulses associated with different compounds that are supplied from different columns.

Figure 9:
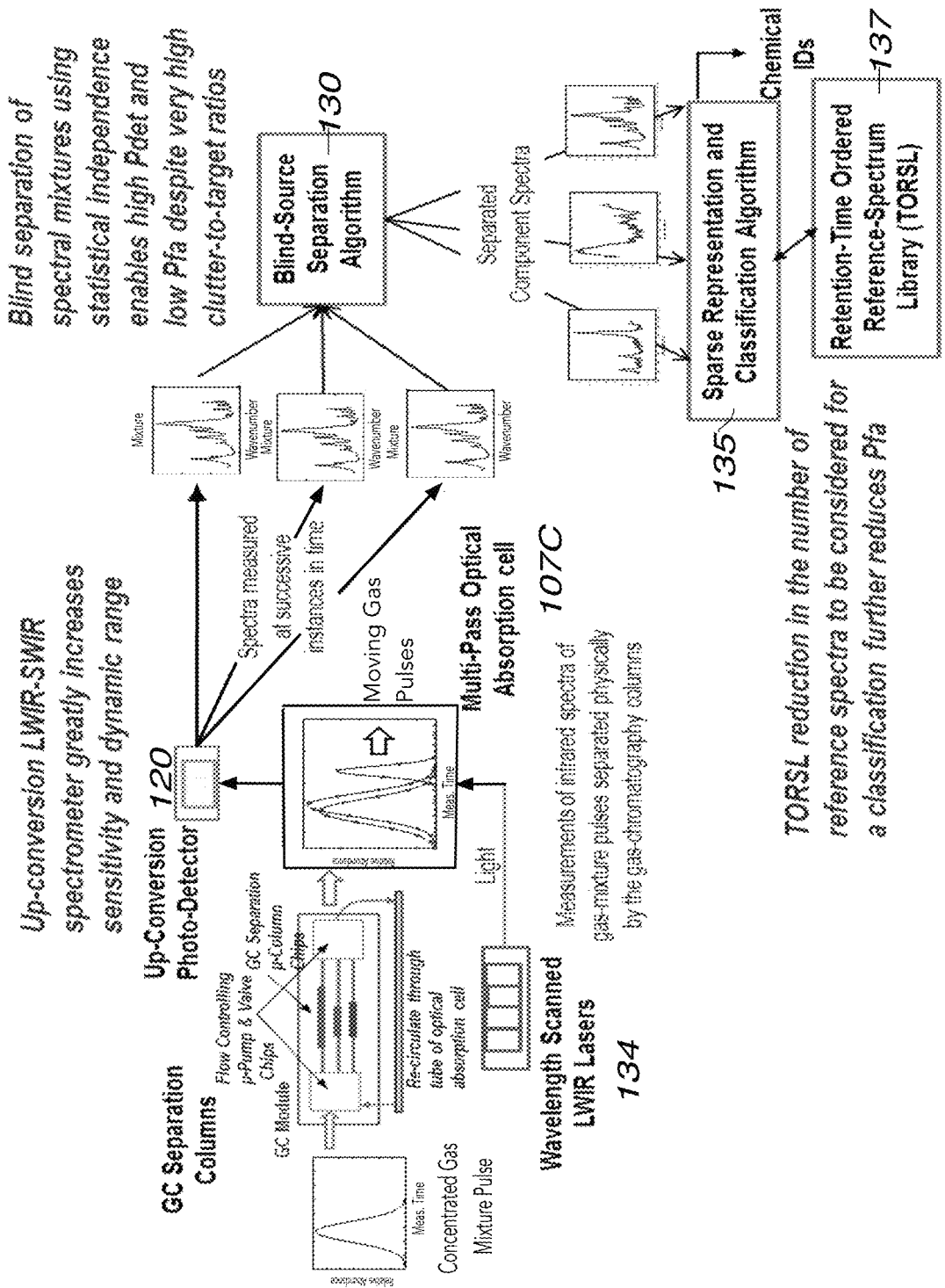
FIG. 9 is a block diagram illustrating the spectral measurement and analysis modules of the adaptive chemical analyzer.

FIG. 9 is a block diagram illustrating the software modules used to implement the spectral measurement and analysis modules of the adaptive chemical analyzer. This figure illustrates a simple example for which the pulses from three compounds in the sample gas mixture which is coupled into the absorption cell 107C have some temporal overlap within a given observation time window. The dots visible in this plot indicate the instances when an absorption spectrum is measured. As illustrated, the relative concentrations or abundances of the three compounds change from one spectral measurement to another. This variation in abundance is useful for the ICA de-mixing algorithm 130 that processes the measured spectra.

FIG. 9 also illustrates the measured spectrum obtained at three instances of time. Since the abundance of one compound is much greater than the abundances of the other two compounds, for this example, the measured spectrum resembles that spectrum of the most abundant compound. The ICA algorithm 130 analyzes a set of measured spectra and produces a set of de-mixed or component spectra. The measured absorption spectra are obtained over a selected period of time. Absorption spectra may be measured continuously. Spectra collected over a period of time corresponding to the occurrence of an analyte pulse or sequence of analyte pulses could typically take tenths of seconds to several seconds. The de-mixed component spectra (examples of three component spectra also are shown in FIG. 9) have somewhat similar looking spectra associated with the individual compounds in the mixture and essentially should be combinations of the characteristic spectra for several individual compounds.

By analyzing each ICA-produced de-mixed component spectrum (produced by the ICA algorithm 130), the SRC algorithm 135 identifies the chemicals associated with that component spectrum and estimates the relative concentrations of those chemicals. The SRC algorithm 135 assumes that each component spectrum can be described as a combination of several differently weighted reference spectra. Those reference spectra are stored in a spectral-reference library. the SRC algorithm 135 assumes that the component spectrum includes only a few of the available reference spectra and thus preferably uses a sparse sampling of the entire library. This enables the SRC algorithm 135 to form the reconstructed spectrum more quickly. Each reconstructed spectrum is compared with the ICA-produced component spectrum. The SRC algorithm 135 iteratively adjusts the reconstructed spectrum, removing certain reference spectra, adding other reference spectra and changing the weights assigned to each included reference spectrum until a sufficiently accurate match is obtained, or until a subsequent reconstruction attempt involves only a small change in the weights.

Thus, the GC columns 102 produce a partial separation, in time, of a complex mixture of chemical compounds being analyzed. For each interval of time, the ICA algorithm 130 accomplishes a further algorithmic de-mixing of the components in the optical absorption spectra measured for those partially separated compounds from the GC columns, producing a set of de-mixed component absorption spectra. Then for each component spectrum, the SRC algorithm 150 accomplishes a final algorithmic separation of the chemical constituents associated with that component spectrum by decomposing that spectrum into a combination of selected reference absorption spectra of those chemical compounds. Gas-phase absorption is a linear process, with the measured absorption spectrum of a mixture being a linear combination of the absorption spectra of each chemical compound in that mixture and with the relative weights of those absorption spectra determined by the relative number of molecules of that compound in the mixture (Beer's law). The ICA algorithm 130 assumes the spectra associated with each compound is statistically independent of the spectra associated with the other compounds (molecules), which is an accurate assumption for the gas-phase absorption. The ICA algorithm 130 also assumes the different measured spectra are statistically independent of each other, which also is an accurate assumption since each measurement likely involves the interaction of the LWIR photons with a different collection of molecules in the gas-flow through the optical absorption cell. Thus the ICA algorithm 130 performs a statistical analysis to identify those absorption spectra in the measured spectra which appear to be associated with a single molecule. The SRC then attempts to associate the absorption spectra associated with that single molecule with reference absorption spectra in the library to identify which molecule was singled out by the ICA algorithm 130. The SRC algorithm 135 assumes each chemical compound has a characteristic absorption spectrum (each of which may be represented by slightly differences instances thereof as previously mentioned), which is an accurate assumption for the gas-phase mid-infrared absorption spectra. Two different gas-phase molecules do not have sufficient interaction with each another to alter their molecular vibrational resonances and thus their absorption spectra.

Figure 10A:
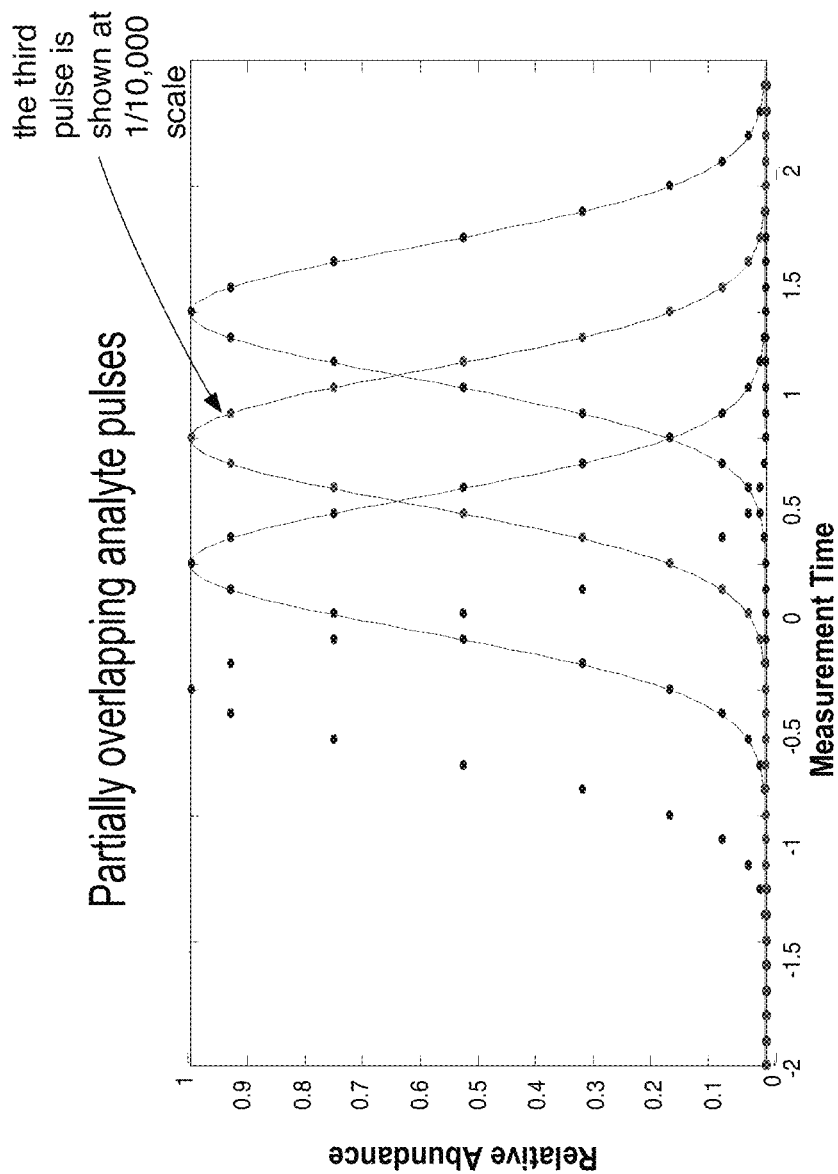
FIGS. 10($a$), FIGS. 10($b$)(1) thru 10($b$)(4) and FIGS. 10($c$)(1) thru 10($c$)(4) provide examples of algorithmic de-mixing accomplished by ICA, showing, for example, the temporal elution pattern of a partially separated mixture of four compounds in FIG. 10($a$), the characteristic spectra of the four compounds in the mixture in FIG. 10($b$)(1)-(4) and the de-mixed component spectra produced by ICA in FIG. 10($c$)(1)-(4).

FIG. 10(a), FIG. 10(b)(1) thru FIG. 10(b)(4) and FIG. 10(c)(1) thru FIG. 10(c)(4) provides examples of algorithmic de-mixing accomplished by the ICA algorithm 130, showing, for example, the temporal elution pattern of a partially separated mixture of four compounds in FIG. 10(a), the characteristic spectra of the four compounds in the mixture in FIG. 10(b)(1-4) and the de-mixed component spectra produced by the ICA algorithm 130 in FIG. 10(c) (1-4).

To further illustrate the de-mixing done by the ICA algorithm 130, FIG. 10(a), FIG. 10(b)(1) thru FIG. 10(b)(4) and FIG. 10(c)(1) thru FIG. 10(c)(4) show an example in which four analyte compounds are present in the gas flowing through the optical absorption cell 107C. The temporal pulses of these four compounds are shown in FIG. 10(a) as are the characteristic absorption spectra of those 4 compounds (shown in FIG. 10(b)(1) thru FIG. 10(b)(4)). The times indicated are relative to a reference point arbitrarily placed at the peak of one of the output pulses from the GC column. One of the compounds (the third pulse) is much more abundant than the other compounds, 10,000 times more abundant in this example. So the abundance of the third pulse is really 10,000 and not one. Showing all four pulses with their relative heights of one for pulses 1, 2 & 4 and 10,000 for pulse 3 would result in a drawing where in the relative heights of one for pulses 1, 2 & 4 would be too small to be depicted.

The measured spectra resemble the characteristic spectrum of the abundant compound. FIG. 10(c)(1) thru FIG. 10(c)(4) show four of the de-mixed component spectra generated by the ICA algorithm 130. (The well-known JADE algorithm was used for constructing this example. See, for example, D. N. Rutledge, "Independent Components Analysis with the JADE algorithm", *TrAC Trends in Analytical Chemistry*, Vol. 50, pp. 22-32, 2013). It is clear from these four exemplary component spectra that each spectrum has a strong resemblance to the characteristic spectrum of one of the compounds in the mixture. It also is evident that some of the component spectra also contain features that can be associated with spectral features of the characteristic spectra of two or more compounds in the mixture.

In some embodiments, the presence of spectral features from multiple characteristic spectra in a demixed component spectrum generated by the ICA algorithm 130 is more pronounced when at least one of those characteristic spectra has broad spectral features. This observation is illustrated by FIGS. 11(a)(1) thru 11(a)(4) and FIGS. 11(b)(1) thru 11(b)(4)) which illustrate another example of the characteristic spectra for analytes in a partially separated mixture and the component spectra generated by the ICA algorithm 130. The SRC algorithm 135 is able to identify the various constituents in each of the component spectra and associate them with the appropriate characteristic spectra in the library. A measure of the desired identification accuracy can be represented as a probability of a correct detection, Pd, for a given probability of false detection or false alarm, Pfa. Analytes whose spectra have sharper or more structured features (such as those in the first example of FIG. 10(a), FIG. 10(b)(1) thru FIG. 10(b)(4) and FIG. 10(c)(1) thru FIG. 10(c)(4)) can achieve a desired Pd/Pfa at a higher level of the detector noise than analytes whose spectral features have less (or more gradually varying) structure (such as those in the second example of FIGS. 11(a)(1) thru 11(a)(4) and FIGS. 11(b)(1) thru 11(b)(4)). These simulation results are summarized in FIG. 11(c).

For these simulations, the relative detector noise is the total equivalent optical noise power of the detection circuit, including the photodetector dark current noise and shot noise and the electronic circuit noise, referred to the photodetector input. This equivalent optical noise power is indicated as being a certain value of decibels (dB) below the optical signal power at some value of wavenumber for which the analytes in the absorption cell have zero or negligible absorption. Thus, this value indicates the signal-to-noise dynamic range of the detector circuit. FIG. 11(d) shows the simulation results for Pd vs Pfa when the relative detector noise is higher than the largest spectral features of the three less abundant compounds in the mixture illustrated in FIGS. 11(a)(1) thru 11(a)(4) and FIGS. 11(b)(1) thru 11(b)(4). Since the most abundant component is 10,000 times more abundant than the other three components, the relative intensity of a main spectral peak of the characteristic spectrum for a less abundant analyte compound in the mixture would be −40 dB. Analyte identification accuracy better than Pd>0.95 for Pfa<0.001 is achieved even when the detector noise level (at −32 dB) is 8 dB higher than the peaks of the characteristic spectral features for those less abundant analytes.

The graphs of FIG. 12(a) are illustrations of the molecular absorption spectra, FIG. 12(b) depicts a GC-column elution pattern and FIG. 12(c) depicts spectral reference library for a simulation example. In this example the analyte mixture coupled into the tube 107 of the infrared absorption cell 107C has ten analyte compounds whose elution peaks or pulses overlap each other. Such a situation might occur because the outputs from multiple GC columns 102 could be coupled into the tube 107, with each column eluting several analytes in the same time interval. For the case illustrated, it is assumed that the GC columns 102 are able to separate the input mixture such that the analytes present at the same time in the IAS tube have characteristic spectra whose main spectral features are distinct from each other. The characteristic spectra of the ten analyte compounds are shown in the ten graphs of FIG. 12(a). It is clear from these graphs that the absorption spectrum for each of the ten compounds has at least one prominent feature that is located at a different wavenumber than the prominent features in the absorption spectra of the other compounds. The temporal pattern in which these ten compounds are coupled into the tube of the IAS is shown in FIG. 12(b). The order in which these compounds appear is: 1, 2, 9, 20, 23, 28, 29, 33, 40 and 43. The abundance of compound 40 is 10,000 times greater than the abundance of the other nine compounds, and its absorption spectrum graph is enclosed in a solid like for emphasis. The analyte pulses have substantial overlap with each other and the spectrum of the $10^4$ times more abundant analyte (analyte number 40) would dominate the spectra of the other nine pulses.

To algorithmically de-mix the spectra for this ten-analyte example, the detection SNR may need to be higher than the detection SNR required for the simpler examples of (i) FIG. 10(a), FIG. 10(b)(1) thru FIG. 10(b)(4) and FIG. 10(c)(1) thru FIG. 10(c)(4) and (ii) FIGS. 11(a)(1) thru 11(a)(4) and FIGS. 11(b)(1) thru 11(b)(4). FIGS. 12(c) and 12(d) show the chemical identification accuracy achieved by the combination of the ICA algorithm 130 and the SRC algorithm 135 for this 10-analyte example. When the photodetection noise is −53 dB and one of the ten compounds in the mixture is 10,000 times more abundant than the other compounds (see FIG. 12(c)), the probability of a correct identification is greater than 0.95 even when the threshold used by the SRC algorithm 135 for making the identification decision is set to achieve a false-alarm probability of $10^{-4}$. Note that for this example, the probability of making a correct identification (Pdet) depends on the noise level of the photodetection process (as indicated in FIG. 12(d)). Thus, for this example, the identification accuracy is noise limited, as desired, and is not limited by having insufficiently distinct spectral features in the absorption spectra of the various compounds in the mixture. If the photodetection noise were reduced to −56 dB, nearly perfect identification is achieved. Even when the photodetection noise is −50 dB, the ICA/SRC algorithms are able to identify all ten of the compounds in the mixture with an accuracy better than 80% (Pdet>0.8). For these examples, a set of 40 spectral measurements is considered by the ICA algorithm 130 in generating the de-mixed component spectra that are then analyzed by the SRC algorithm 135. The times at which those 40 measurements are done, relative to the abundances of the gas pulses for each of the compounds in the mixture, are shown as the dots in the plots of FIG. 12(b).

The ten graphs of FIG. 13(a) illustrate the molecular absorption spectra for ten analyte compounds output from the GC module into the tube 107 of the infrared absorption cell 107C. FIG. 13(b) illustrates the temporal distribution of those ten analyte compounds as they are coupled into the tube 107 of the infrared absorption cell 107C, and FIG. 13(c) illustrates four additional spectra in the reference spectrum library having characteristic features that are similar to those of four analyte compounds.

FIGS. 13(a), 13(b), 13(c) 14(a) and 14(b) illustrate the benefit of reducing the spectral library that must be considered by the SRC algorithm 135 when modeling a de-mixed component spectrum generated by the ICA algorithm 130. For this example, the analyte mixture in the infrared absorption cell again contains ten different analyte compounds that are only partially separated by the gas chromatography module 102M. Unlike the example of Figs. FIGS. 12(a), 12(b) and !2(c), the characteristic spectra for these ten analytes have spectral features that have substantial overlap with each other, as illustrated in FIG. 13(a). As a result, one might expect that a higher detector SNR would be needed to distinguish between the ten analyte compounds. The temporal pattern of the gas-phase pulses of these compounds as they are eluted from the GC columns 102 and appear in the absorption cell 107C is depicted in FIG. 13(b). The order in which these compounds appear is number 11 followed by 29, then 33, 44, 27, 43, 16, 7, 13 and then 32. Compound 13 is 10,000 times more abundant than the other compounds and its absorbance spectrum dominates the measured spectrum. Each measured spectrum could include the spectra features from as many as seven to ten of the compounds.

Figure 14A:
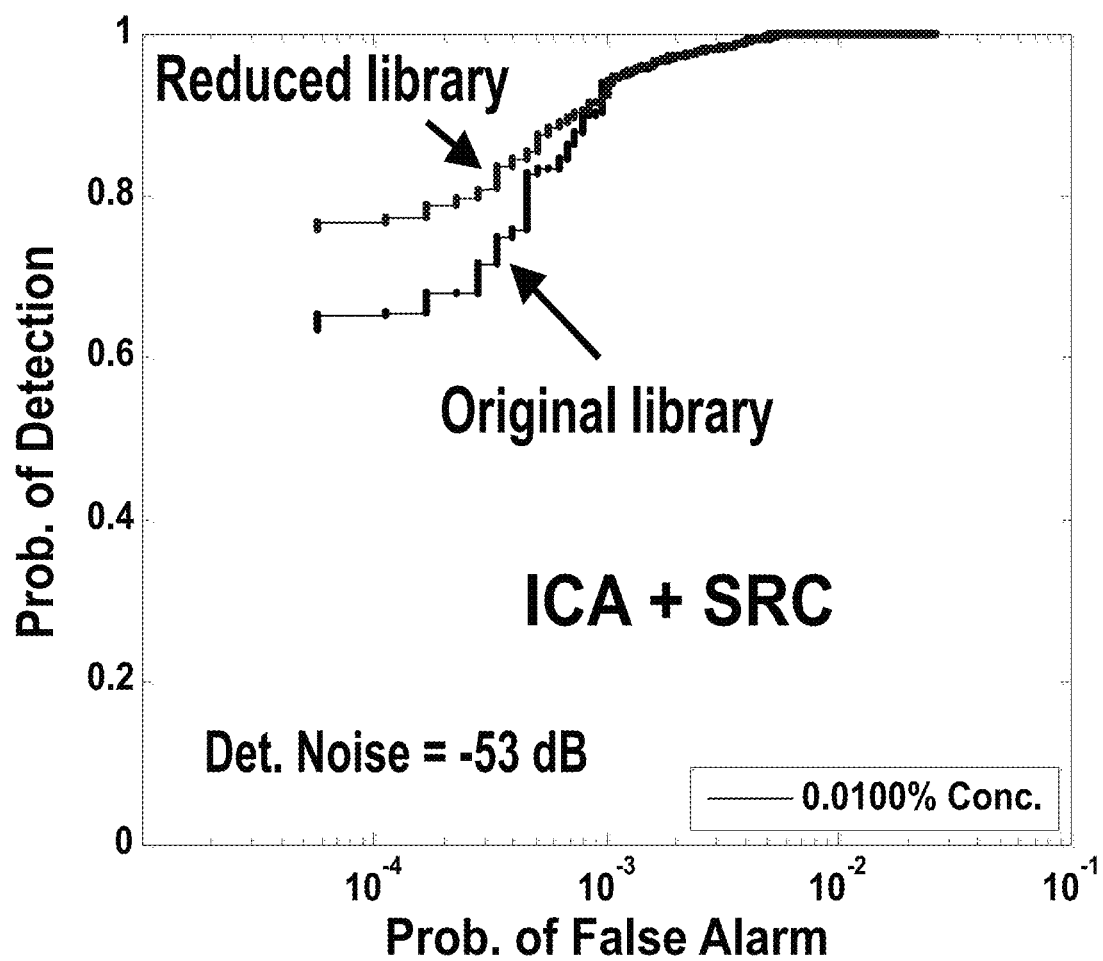
FIGS. 14($a$) and 14($b$) show the analyte identification performance for a ten-component mixture of FIGS. 13($a$), 13($b$) and 13($c$)
Figure 14B:
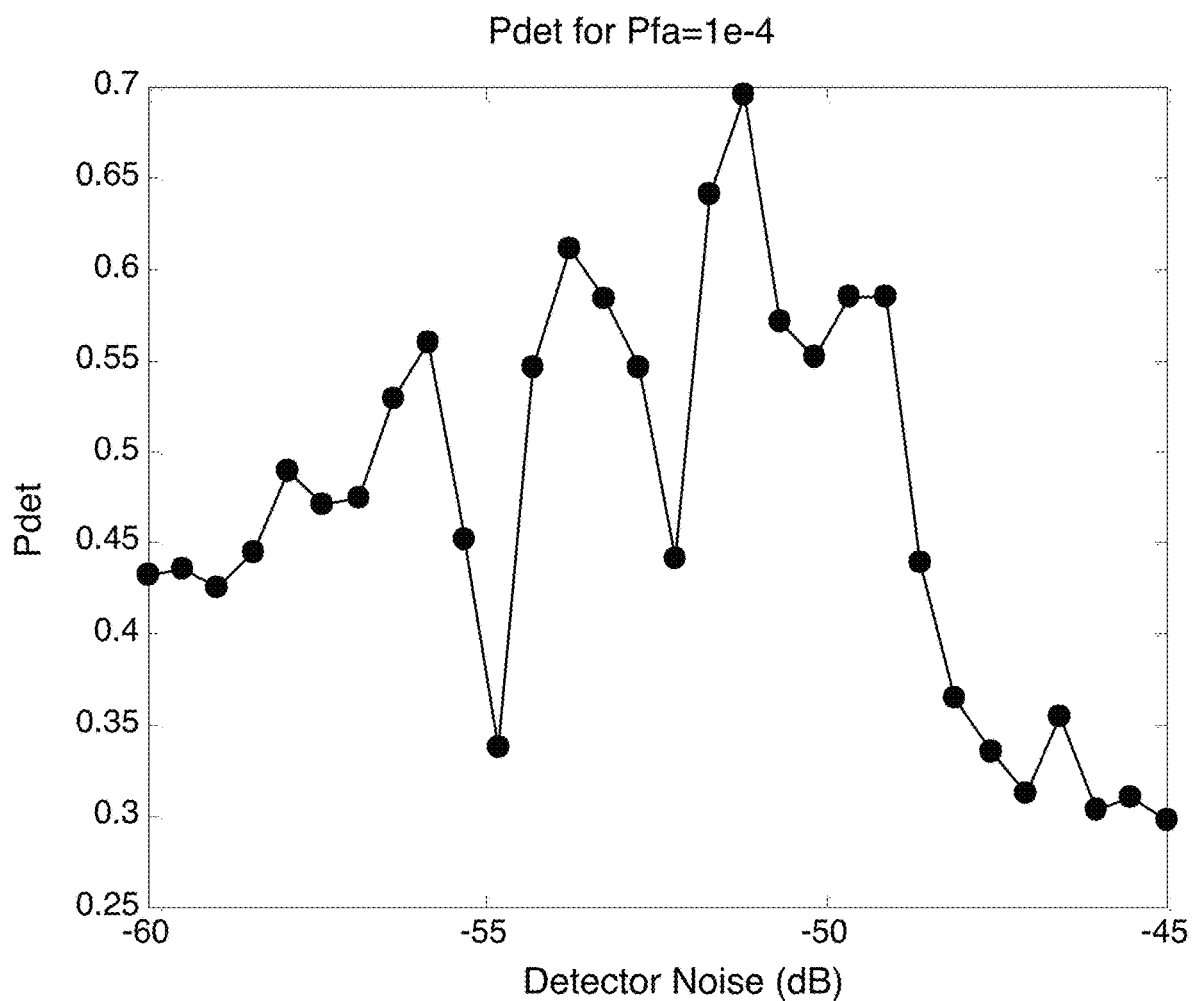

FIG. 14(a) shows the results of the chemical identification achieved when the ICA algorithm 130 and the SRC algorithm 135 are applied to the measured spectra. For this example (the curve labeled "Original library"), the probability of obtaining an incorrect identification, or a false alarm, is below $2\times10^{-3}$ when the decision threshold is set to achieve a probably of a correct identification of 0.95. Alternatively, when the threshold is set to achieve a false-alarm probability of $10^{-3}$, the probability of obtaining a correct identification is approximately 0.9. Assuming the threshold is set for a false-alarm probability (Pfa) of $10^{-4}$, FIG. 14(b) shows that the probability of a correct identification (Pdet) does not have a clear dependence on the noise of the photodetection process. This result suggests that the incorrect identifications are a result of not being able to sufficiently distinguish between the characteristic spectrum of one compound from the characteristic spectrum of another compound in the mixture or another compound represented in the library that has a very similar characteristic spectrum. We conclude from comparing the characteristic spectra of the 10 compounds (FIG. 13(a)) that the SRC algorithm 135 should have been able to distinguish between those compounds. However, four of those compounds—11, 33, 44 and 16—have a characteristic spectrum that is similar to the characteristic spectrum of yet another component in the library—15, 35, 28 and 14, respectively (see FIG. 13(c)). Thus, the SRC algorithm 135 would have difficulty distinguishing between these pairs of compounds, such as between compound 11 and compound 15, or between compound 33 and compound 35. By designing the GC columns 102 such that compounds 15, 35, 28 and 14 could not be present in the absorption cell at the same time as compounds 11, 33, 44 and 16, those compounds could be excluded from the library that is considered when the SRC algorithm 135 is identifying the mixture containing compounds 11, 33, 44 and 16.

Compounds 35, 28, 14 and 15 have different boiling point and/or molecular polarity than their associated compounds 33, 44, 16 and 11. Thus, compounds 35, 28, 14 and 15 would not be present in the output from the GC columns 102 at the same time as the analyte compounds 33, 44, 16 and 11, if the GC module 102M is designed well. As a result, the reference spectrum library being considered by the SRC algorithm 135 during the interval of time when the SRC algorithm 135 is analyzing the component spectra for an analyte mixture that contains compounds 33, 44, 16 and 11 does not need to include the characteristic reference spectra for 35, 28, 14 and 15. Instead, a reduced reference spectrum library of 22 spectra could be used, with those four characteristic spectra removed. The second curve shown in FIG. 14(a) (labeled "Reduced library") provides the results when these four reference spectra are removed from the library considered by the SRC algorithm 135 for the spectrum modeling. The identification accuracy is improved substantially, especially for cases in which the Pfa is $10^{-3}$ or lower.

FIGS. 13(a), 13(b), 13(c) 14(a) and 14(b) illustrate the benefit of knowing which combination of chemical compounds could appear at a given time in the outputs from the GC columns 102 and thus be present in the gas flow whose infrared absorption spectrum is measured by the IAS. This knowledge is used to organize the reference spectra library such that specific subsets of the spectra in the library are considered at a given time by the SRC algorithm 135. This knowledge is derived from knowing the elution characteristics of the various GC columns 102 and also knowing which compounds could possibly have been introduced into a given GC column 102 from the outputs of the other columns 102. Such knowledge can be obtained from having characterized the elution or retention-time behavior of the library compounds in these GC columns 102 beforehand. Such knowledge also is used by the controller 140 in the disclosed analyzer that determines which temporal portion of the output from a GC column is coupled into the input of another GC column.

The simulation results of FIGS. 10(a)-14(b) also demonstrate the benefit of the larger dynamic range achievable with the up-conversion detector 120 of FIG. 8(a) or 8(b). Compared to a LWIR detector, which has a dynamic range of $10^2$ (for TE-cooled devices) to as high as $10^4$ (for cryo-cooled devices), the up-conversion detector 120 has a dynamic range of $10^4$ to $>10^5$ even when operated un-cooled. This dynamic range can be limited by the shot noise (associated with having intense pulses) if the absorption at a given wavenumber is weak, such that there is a very small change in the laser pulse intensity at the input to the up-conversion detector system 120, and thus the laser pulse is still very strong. When the absorption is strong, such as at those wavenumbers corresponding to the prominent spectral features in the characteristic spectrum of an analyte, the laser pulse intensity from the absorption cell 107C is weaker (because of the absorption by the analyte molecules) and the shot noise is reduced. For the InGaAs photo-detector devices of an up-conversion detector module, the dark-current noise limited dynamic range can be as high as $10^6$ and the shot-noise limited dynamic range can be higher than $10^5$.

FIG. 15 is a block diagram of the various hardware and software elements in the disclosed chemical analyzer. These modules are the sample/concentrator 105, the separation columns 102, and a multi-pass absorption cell 107C. The input gas to be analyzed is collected by the sampler/concentrator 105 which then injects a short temporal pulse of the analyte mixture into the separation columns. The separation columns 102 output a stream of gas-phase pulses into the absorption cell 107C, with at least some of those pulses still comprising mixtures of partially time-wise separated compounds. A set of LWIR lasers 125 whose emission wavelength is scanned produces laser light that is coupled into the absorption cell 107C. For a given interval of time, certain wavelengths of that light are absorbed by the molecules in the absorption cell and this wavelength-dependent pattern of absorbed light is the LWIR spectrum. The LWIR pattern is preferably converted into a SWIR pattern by the up-conversion detector 120 and that SWIR spectral pattern is converted into a numerical pattern, the measured absorption spectrum, by a photodetector 122 and its associated processing electronics in the up-conversion detector 120. A set of several measured absorption spectra is processed by a blind source separation module 130 that executes an algorithm such as ICA to produce a set of de-mixed component spectra. Each component spectrum is then processed by a library-based classification module 135 that executes an algorithm such as SRC to make a determination of the compounds associated with the component spectrum. This classification module preferably makes use of a subset of reference spectra stored in a time ordered reference spectrum library (TORSL) 137. An instrument controller 140, powered by a microprocessor 142 or other computing device is connected to these various modules and controls these modules and determines the flow of material (gasses)

between the hardware elements and data/information flow between the software modules.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A gas-phase chemical analyzer comprising a plurality of gas chromatography columns in gas-flow communication with an gas flow input of at least one gas carrying tube of an optical absorption cell, a recirculation path for routing a gas flowing from said optical absorption cell to another gas chromatography column, a laser for illuminating molecules in a gas mixture flowing though said at least one gas carrying tube of the optical absorption cell, a photodetecting apparatus for measuring absorption spectra of the gas mixture illuminated by said laser, a first module which implements an Independent Component Analysis (ICA) algorithm for statically distinguishing, based on the measured absorption spectra, particular molecules in said gas mixture from other molecules in said gas mixture and a second module which implements a Sparse Reconstruction and Classification (SRC) algorithm for comparing spectra for at least selected ones of the particular molecules in said gas mixture with a reference library of absorption spectra of previously identified molecules and for determining the likelihood of a correct identification of the particular molecules in said gas mixture and the previously identified molecules in said reference library, wherein the Independent Component Analysis (ICA) algorithm and the Sparse Reconstruction and Classification (SRC) algorithm are implemented in software executing, in use, on a computing device.

2. The gas-phase chemical analyzer of claim 1 further including at least one gas flow controller for controlling how the gas mixture flows from the one gas chromatography column to the another gas chromatography column and whether the gas mixture flows to the at least one gas carrying tube of the optical absorption cell before or after flowing to the another gas chromatography column.

3. The gas-phase chemical analyzer of claim 2 wherein the at least one gas flow controller is responsive at least in part to the likelihood of a correct identification of the particular molecules in said gas mixture as determined by said second module.

4. The gas-phase chemical analyzer of claim 2 wherein the computing device is a microprocessor.

5. The gas-phase chemical analyzer of claim 2, wherein the laser is a wavelength scanning long wave infrared (LWIR) laser and the photodetecting apparatus comprises a LWIR photodetector formed of either HgCdTe material or an InAs/GaSb superlattice.

6. The gas-phase chemical analyzer of claim 2, wherein the laser is a wavelength scanning long wave infrared (LWIR) laser and the photodetecting apparatus comprises a LWIR to short wave infrared (SWIR) upconverting cavity and a SWIR photodetector.

7. The gas-phase chemical analyzer of claim 6, wherein the LWIR to SWIR upconverting cavity comprises nonlinear optical quasi-phase-matching (QPM) piece or crystal which is responsive to LWIR light from the optical absorption cell and to light from a wavelength scanning SWIR pump laser.

8. A gas-phase chemical analyzer comprising a computing device, first and second first gas chromatography columns in gas-flow communication with a gas flow input of an optical absorption cell, an arrangement of valves in gas-flow communication with a gas flow output of the optical absorption cell and in gas flow communication with gas flow inputs of said first and second gas chromatography columns, at least one gas flow controller for selecting whether the gas mixture flowing via said arrangement of valves from the optical absorption cell flows to the gas flow input of said first gas chromatography column or to the gas flow input of second gas chromatography column or to both the gas flow inputs of said first and second gas chromatography columns, a laser for illuminating molecules in at least one gas mixture flowing, in use, though said optical absorption cell and a photodetecting apparatus for detecting absorption spectra of the at least one gas mixture illuminated, in use, by said laser, said laser being a long wave infrared (LWIR) laser, the computing device receiving detected absorption spectra from the photodetecting apparatus, the photodetecting apparatus including a short wave infrared (SWIR) photodetector and a LWIR to SWIR upconverting cavity, the upconverting cavity including a non-linear optical quasi-phase-matching (QPM) piece or crystal and a wavelength scanning SWIR pump laser, the QPM piece or crystal being responsive to LWIR light from the optical absorption cell and to light from said wavelength scanning SWIR pump laser, the at least one gas flow controller being controlled, in use, by said computing device for controlling which one of said first and second as chromatography columns receives the gas mixture in response to said detected absorption spectra.

9. The gas-phase chemical analyzer of claim 8 further including at least one additional gas flow controller for controlling how the gas mixture flows from a gas flow output of a selected one of said first and second gas chromatography columns to a gas flow input of the optical absorption cell, the at least one additional gas flow controller being controlled by said computing device.

10. The gas-phase chemical analyzer of claim 9 wherein the at least one gas flow controller and the at least one additional gas flow controller cooperate under control of said computing device to control whether the gas mixture flows to a selected one of said first and second gas chromatography columns after flowing to another selected one of said first and second gas chromatography columns via said optical absorption cell.

11. The gas-phase chemical analyzer of claim 8 further including a software first module executing, in use, on said computing device for statically distinguishing spectra for particular molecules in said gas mixture from spectra for other molecules in said gas mixture and a software second module executing, in use, on said computing device for comparing at least selected ones of the spectra for particular molecules in said gas mixture with a reference library of absorption spectra of previously identified molecules and for determining the likelihood of a correct identification of the particular molecules in said gas mixture from the previously identified molecules in said reference library, said computing device selecting said selected one of said first and second gas chromatography columns in response thereto.

12. The gas-phase chemical analyzer of claim 8 wherein at least one gas flow controller, in use, selecting whether the gas mixture flowing from a gas flow output of the optical absorption cell flows to the gas flow input of said first gas chromatography column or to the gas flow input of second gas chromatography column or to both the gas flow inputs of said first and second gas chromatography columns.

13. A gas-phase chemical analyzer comprising a computing device, at least one gas chromatography column in gas-flow communication with at least one gas carrying tube of an optical absorption cell, a laser for illuminating molecules in a gas mixture flowing though said at least one gas carrying tube of the optical absorption cell, a photodetecting apparatus for measuring absorption spectra of the gas mixture illuminated by said laser, the laser being a wavelength scanning long wave infrared (LWIR) laser, wherein said at least one gas chromatography column comprises a plurality of gas chromatography columns connected gas-flow wise in series with the at least one gas carrying tube of the optical absorption cell and further including at least one gas flow controller for controlling how the gas mixture flows from one gas chromatography column to another gas chromatography column via said optical absorption cell, the at least one gas flow controller controls, in response to said computing device, whether the gas mixture flows to the at least one gas carrying tube of the optical absorption cell either before or after flowing to said another gas chromatography column, the computing device receiving detected absorption spectra from the photodetecting apparatus, the photodetecting apparatus including a LWIR to short wave infrared (SWIR) upconverting cavity and a SWIR photodetector, the LWIR to SWIR upconverting cavity including a non-linear optical quasi-phase-matching (QPM) piece or crystal which is responsive to LWIR light from the optical absorption cell and a wavelength scanning SWIR pump laser, the at least one gas flow controller being controlled, in use, by said computing device for controlling how the gas mixture flows from said one gas chromatography column to said another gas chromatography column and also via said optical absorption cell.

14. A gas-phase chemical analyzer comprising a computing device, first and second first gas chromatography columns in gas-flow communication with a gas flow input of an optical absorption cell, an arrangement of valves in gas-flow communication with a gas flow output of the optical absorption cell and in gas flow communication with gas flow inputs of said first and second gas chromatography columns, at least one gas flow controller for selecting whether the gas mixture flowing via said arrangement of valves from the optical absorption cell flows to the gas flow input of said first gas chromatography column or to the gas flow input of second gas chromatography column or to both the gas flow inputs of said first and second gas chromatography columns, a laser for illuminating molecules in at least one gas mixture flowing, in use, though said optical absorption cell and a photodetecting apparatus for detecting absorption spectra of the at least one gas mixture illuminated, in use, by said laser, the computing device receiving detected absorption spectra from the photodetecting apparatus, the at least one gas flow controller being controlled, in use, by said computing device for controlling which one of said first and second as chromatography columns receives the gas mixture in response to said detected absorption spectra and further including a sampler/concentrator for collecting and concentrating a mixture of analytes and injecting that mixture as a temporal pulse into one of said first and second gas chromatography columns, the first and second gas chromatography columns having different coating materials whereby molecules of different chemical species in said mixture of analytes adhere to and are retained by the first and second first gas chromatography columns for differing periods of time, the first and second gas chromatography columns outputting, in use, streams of gas-phase temporal pulses into the absorption cell, with at least some of those pulses comprising different mixtures of time-wise separated compounds from said analytes.

15. The gas-phase chemical analyzer of claim 14 further including a software first module executing, in use, on said computing device for generating multiple demixed spectra, each of said multiple demixed spectra being associated with different mixtures of time-wise separated compounds from said analytes.

16. The gas phase chemical analyzer of claim 15 further including a software second module executing, in use, on said computing device for reconstructing said each of said multiple demixed spectra as a weighted combination of selected reference spectra that are stored in a reference library.

17. The gas phase chemical analyzer of claim 16 wherein said software second module executes, in use, on said computing device for selecting a first subset of reference spectra from the reference library to be considered for analysis of a demixed spectrum at a first time and a second subset of reference spectra from the reference library to be considered for analysis of a demixed spectrum at a second time.

18. A gas-phase chemical analyzer comprising a computing device, plurality of gas chromatography columns in gas-flow communication with a gas flow input of at least one optical absorption cell, at least one gas flow controller for selectively routing gas flowing from said at least one optical absorption cell to a gas flow input of another one or ones of said plurality of gas chromatography columns, a laser for illuminating molecules in at least one gas mixture flowing, in use, though said optical absorption cell and a photodetecting apparatus for detecting absorption spectra of the at least one gas mixture illuminated, in use, by said laser, the computing device, in use, receiving said absorption spectra of the at least one gas mixture illuminated, the at least one gas flow controller being controlled, in use, by said computing device and further including a sampler/concentrator for collecting and concentrating a mixture of analytes and injecting that mixture as a temporal pulse into one of said plurality of gas chromatography columns, said one and at least another one of gas chromatography columns having different coating materials whereby molecules of different chemical species in said mixture adhere to and are retained by said one and said at least another one of said plurality of gas chromatography columns for differing periods of time, said one and said at least another one of said plurality of gas chromatography columns outputting, in use, streams of gas-phase temporal pulses into the at least one absorption cell, with at least some of those pulses comprising different mixtures of time-wise separated compounds from said analytes.

19. The gas-phase chemical analyzer of claim 18 further including a software first module executing, in use, on said computing device for generating multiple demixed spectra, each of said multiple demixed spectra being associated with different mixtures of time-wise separated compounds from said analytes.

20. The gas phase chemical analyzer of claim 19 further including a software second module executing, in use, on said computing device for reconstructing said each of said multiple demixed spectra as a weighted combination of selected reference spectra that are stored in a reference library.

21. The gas phase chemical analyzer of claim 20 wherein said software second module executes, in use, on said computing device for selecting a first subset of reference spectra from the reference library to be considered for analysis of a demixed spectrum at a first time and a second subset of reference spectra from the reference library to be considered for analysis of a demixed spectrum at a second time.

* * * * *